United States Patent
Nomura

(10) Patent No.: US 9,430,440 B2
(45) Date of Patent: Aug. 30, 2016

(54) ENVIRONMENT CONSTRUCTION APPARATUS AND METHOD, ENVIRONMENT REGISTRATION APPARATUS AND METHOD, ENVIRONMENT SWITCHING APPARATUS AND METHOD

(71) Applicant: FUJITSU LIMITED, Kawasaki-shi (JP)

(72) Inventor: Yuji Nomura, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 686 days.

(21) Appl. No.: 13/721,969

(22) Filed: Dec. 20, 2012

(65) Prior Publication Data

US 2013/0179530 A1      Jul. 11, 2013

(30) Foreign Application Priority Data

Jan. 6, 2012 (JP) ................................. 2012-001669

(51) Int. Cl.
| | |
|---|---|
| G06F 15/16 | (2006.01) |
| G06F 15/173 | (2006.01) |
| H04L 29/08 | (2006.01) |
| G06F 3/06 | (2006.01) |
| G06F 12/00 | (2006.01) |
| G06F 11/20 | (2006.01) |

(52) U.S. Cl.
CPC ......... *G06F 15/17331* (2013.01); *G06F 3/067* (2013.01); *G06F 3/0617* (2013.01); *G06F 3/0637* (2013.01); *G06F 3/0647* (2013.01); *G06F 11/2028* (2013.01); *G06F 11/2048* (2013.01); *G06F 11/2069* (2013.01); *H04L 29/08072* (2013.01); *G06F 11/2007* (2013.01); *G06F 11/2038* (2013.01)

(58) Field of Classification Search
USPC ......... 709/203, 217–218, 223–229, 250, 231
See application file for complete search history.

(56) References Cited

U.S. PATENT DOCUMENTS 7,472,243 B2 * 12/2008 Nagata ................ G06F 11/2069
                                                                711/162
2006/0053250 A1 * 3/2006 Saze ..................... G06F 3/0608
                                                                711/114

(Continued)

FOREIGN PATENT DOCUMENTS

| EP | 1912115 A2 | 4/2008 |
|---|---|---|
| JP | 2000-242434 | 9/2000 |

(Continued)

OTHER PUBLICATIONS

Japanese Office Action mailed Sep. 1, 2015 for corresponding Japanese Patent Application No. 2012-001669, with Partial English Translation, 3 pages.

(Continued)

*Primary Examiner* — Zarni Maung
(74) *Attorney, Agent, or Firm* — Fujistu Patent Center

(57) ABSTRACT

An environment construction apparatus that carries out, in a second system, acquiring a connection permission data of a first storage in a first system that was set in a second storage of the second system; and extracting identification data of a first server in the first system based on the connection permission data of the first storage of the first system, and assigning the extracted identification data of the first server in the first system as identification data stored in a connection section of a second server in the second system.

16 Claims, 16 Drawing Sheets

(56) References Cited

U.S. PATENT DOCUMENTS

| | | | |
|---|---|---|---|
| 2006/0168067 A1* | 7/2006 | Carlson | G06Q 10/107 709/206 |
| 2007/0186067 A1* | 8/2007 | Nagata | G06F 11/2074 711/162 |
| 2007/0260912 A1 | 11/2007 | Hatasaki et al. | |
| 2009/0217082 A1 | 8/2009 | Hatasaki et al. | |
| 2010/0011179 A1* | 1/2010 | Sano | G06F 11/2069 711/162 |
| 2011/0060941 A1 | 3/2011 | Hatasaki et al. | |
| 2011/0078494 A1 | 3/2011 | Maki et al. | |
| 2011/0225449 A1 | 9/2011 | Hatasaki et al. | |
| 2012/0011394 A1 | 1/2012 | Maki et al. | |

FOREIGN PATENT DOCUMENTS

| | | |
|---|---|---|
| JP | 2007-293422 A | 11/2007 |
| JP | 2011-76128 | 4/2011 |
| JP | 2011-81830 | 4/2011 |

OTHER PUBLICATIONS

Japanese Office Action mailed Apr. 5, 2016 for corresponding Japanese Patent Application No. 2012-001669, with Partial English Translation, 5 pages.

Extended European Search Report dated Jun. 29, 2016 for corresponding European Patent Application No. 12199445.3, 8 pages.

* cited by examiner

FIG. 4

CONFIGURATION TABLE (EXAMPLE)

| GROUP | ACCESS PERMISSION SETTING (HBA WWN) |
|---|---|
| G1(M) | HBA1 |
|  | HBA2 |
| G2(M) | HBA3 |
|  | HBA4 |
| ... | ... |
|  | ... |
| Gn(M) | HBAj |
|  | HBAk |

ENVIRONMENT CONSTRUCTION APPARATUS AND METHOD, ENVIRONMENT REGISTRATION APPARATUS AND METHOD, ENVIRONMENT SWITCHING APPARATUS AND METHOD

CROSS-REFERENCE TO RELATED APPLICATION

This application is based upon and claims the benefit of priority of the prior Japanese Patent Application No. 2012-001669, filed on Jan. 6, 2012, the entire contents of which are incorporated herein by reference.

FIELD

The present invention relates to an environment construction apparatus, an environment registration apparatus, an environment switching apparatus, an environment construction method, an environment registration method, an environment switching method, an environment construction program, an environment registration program and an environment switching program.

BACKGROUND

For business processing servers, generally an operation system including equipment connected to storage for storing data, such as an operation environment, or operation site is constructed, and business is performed by equipment connected to for example servers that employ the storage. There is a need for a system capable of business continuity without interrupting or halting business for situations in which business is performed smoothly by utilizing an operation system of equipment including for example storage and a server. However, in cases where the operation system is a system configured from equipment including servers that employ storage, business is interrupted when equipment including the servers and storage of the operational system are shut down. For example, it would become difficult to continue doing business when storage and server equipment of the operation system are shut down in for example a large-scale maintenance operation or in the event of a disaster. Accordingly, in order to keep business disruption to a minimum and to achieve business continuity, there is demand to continue business and switch over business by switching in-operation storage and server equipment to other storage and server equipment.

Technology for switching over equipment including for example storage and servers involves constructing an operation system including plural servers and storage, and switching over to a standby server that has been provided when problems occur with the in-operation server. For example, the unique identifiers (World Wide Name (WWN)) of connection devices (Host Bus Adapters (HBA)) connected to an in-operation server are switched over to the unique identifiers of connection devices connected to the prepared standby server. So doing enables switching to be made from the operational server to the prepared standby server.

There is also a known disaster countermeasure technique in which data stored at a given site is replicated by storing in storage at a different site. For example, data stored in operational storage at a given site constructed from a server and storage is transmitted to storage installed at a remote location and constructed as another site with a server and storage. A copy of the data stored in the operational storage at the given site is thereby held at the remote site, and loss of the data stored in the operational storage can be prevented even when a disaster occurs.

RELATED PATENT DOCUMENTS

Japanese Laid-open Patent Publication No. 2011-81830
Japanese Laid-open Patent Publication No. 2000-242434

SUMMARY

According to an aspect of the embodiments, a work content creation apparatus includes: a processor, and a memory storing instructions, which when executed by the processor perform a procedure, the procedure including: (a) on a first system including a first server equipped with a connection section that stores identification data for self-identification and including first storage that is equipped with a first storage section stored with data and that is connected to the connection section of the first server, in a state in which the data stored in the first storage section of the first storage is stored in a second storage section of second storage of a second system including a second server equipped with a connection section that stores identification data for self-identification and including the second storage that is equipped with the second storage section stored with data and that is connected to the connection section of the second server, in the first system, setting the first storage with connection permission data representing connection permission for the first server to the first storage and containing identification data of the first server, and setting the second storage with the connection permission data of the first storage in the first system that was set in the first storage; (b) in the second system, acquiring the connection permission data of the first storage in the first system that was set in the second storage; and (c) extracting identification data of the first server in the first system based on the connection permission data of the first storage of the first system that has been acquired in (b), and assigning the extracted identification data of the first server in the first system as identification data stored in the connection section of the second server in the second system.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a configuration table including connection permission data;

DESCRIPTION OF EMBODIMENTS

Examples of exemplary embodiments of technology disclosed herein will be explained in detail with reference to accompanying drawings.

First Exemplary Embodiment

Figure 1:
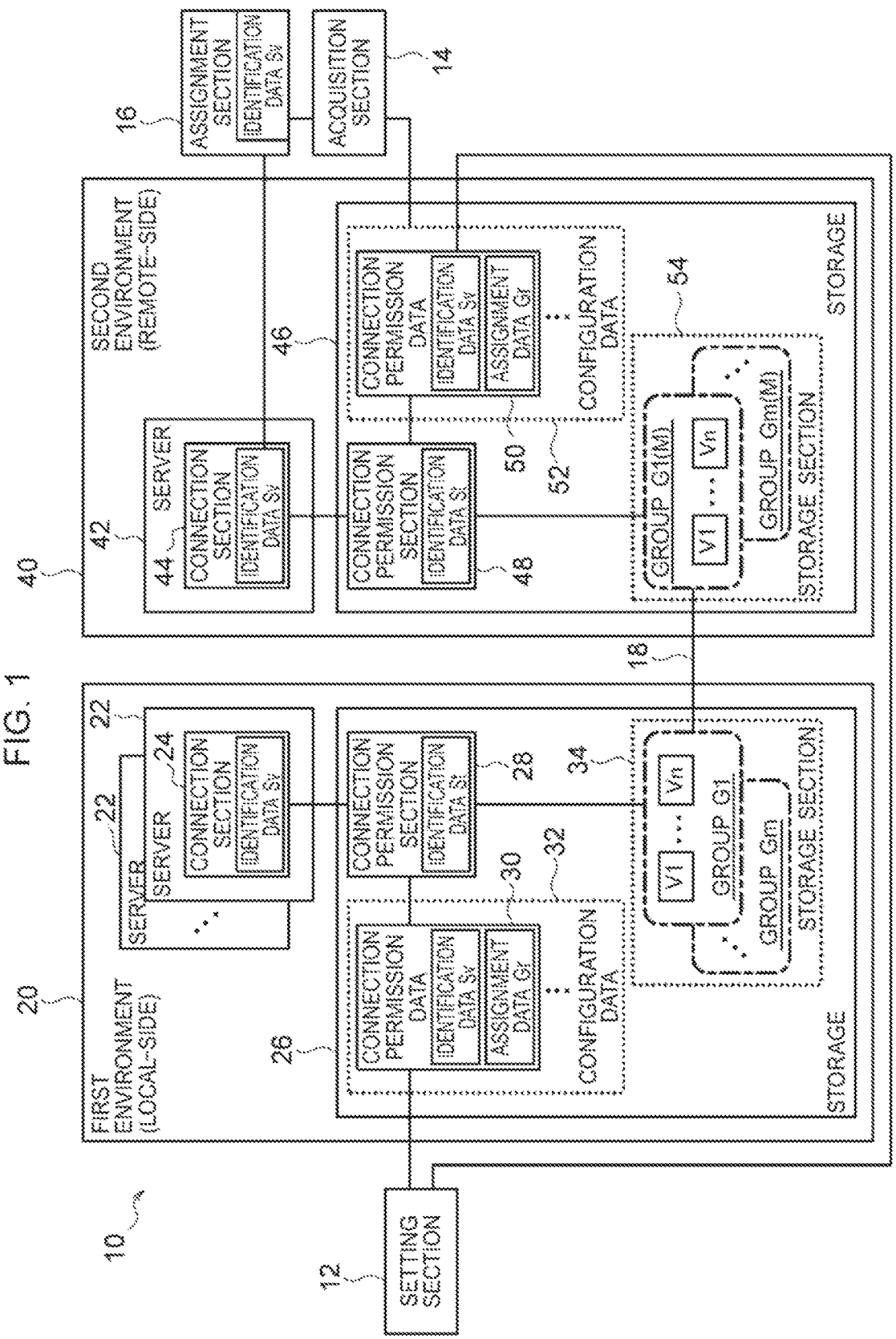
FIG. 1 is a block diagram illustrating a schematic configuration of an environment construction apparatus according to a first exemplary embodiment.

FIG. 1 illustrates an environment construction apparatus 10 according to a first exemplary embodiment. The environment construction apparatus 10 is implemented for example by a computer. The environment construction apparatus 10 includes a setting section 12, an acquisition section 14 and an assignment section 16. The environment construction apparatus 10 includes a first environment (local-side site) 20 serving as a first system containing part of an environment registration apparatus according to the present exemplary embodiment implemented for example by a computer. The environment construction apparatus 10 includes a second environment (remote-side site) 40 serving as a second system containing the environment switching apparatus of the present exemplary embodiment implemented for example by a computer. The first environment 20 and the second environment 40 (the first system and the second system) are connected together so as to be capable of exchanging data between each other through a dedicated line 18.

The first environment (first system) 20 includes plural servers 22 and storage 26. The servers 22 each include a connection section 24, and identification data Sv is set in each of the connection sections 24 to identify the respective server 22. The storage 26 includes a connection permission section 28, a memory 32 that stores configuration data including connection permission data 30 for each server, and a storage section 34 containing plural volumes that are regions for storing data. Identification data St that identifies individual storage is set in the connection permission section 28 of the storage 26. Note that a one or more than one volume contained in the storage section 34 is associated with each of the servers 22 for connecting to (accessing) the storage 26, as explained in detail later. An Operating System (OS), for example to drive a server, can also be stored in the volumes of a storage section contained in the storage.

Note that although an example is illustrated in FIG. 1 of plural servers 22, configuration may be made with a single server 22. The dedicated line 18 may also employ a replication dedicated physical communication line. The dedicated line 18 may also be configured by an inter-storage connection communication line implementing a function to replicate data between storage as a dedicated virtual line. A virtual line for inter-storage connection is, for example, implemented by providing the storage with a function capable of replicating a logical region (volume) provided in storage, between storage without passing through a server, and by executing this function.

The second environment (second system) 40 includes a server 42 and storage 46. The server 42 contains a connection section 44. Identification data Sv for identifying the server 42 is set in the connection section 44. The storage 46 includes a connection permission section 48, a memory 52 that stores configuration data including connection permission data 50 for each server, and a storage section 54. Identification data St that identifies the individual storage is set in the connection permission section 48 of the storage 46. The storage section 54 is configured to replicate (mirror) the storage section 34 of the first environment 20 through the dedicated line 18. Note that although FIG. 1 illustrates a single server 42 plural servers 42 may be provided.

Figure 2:
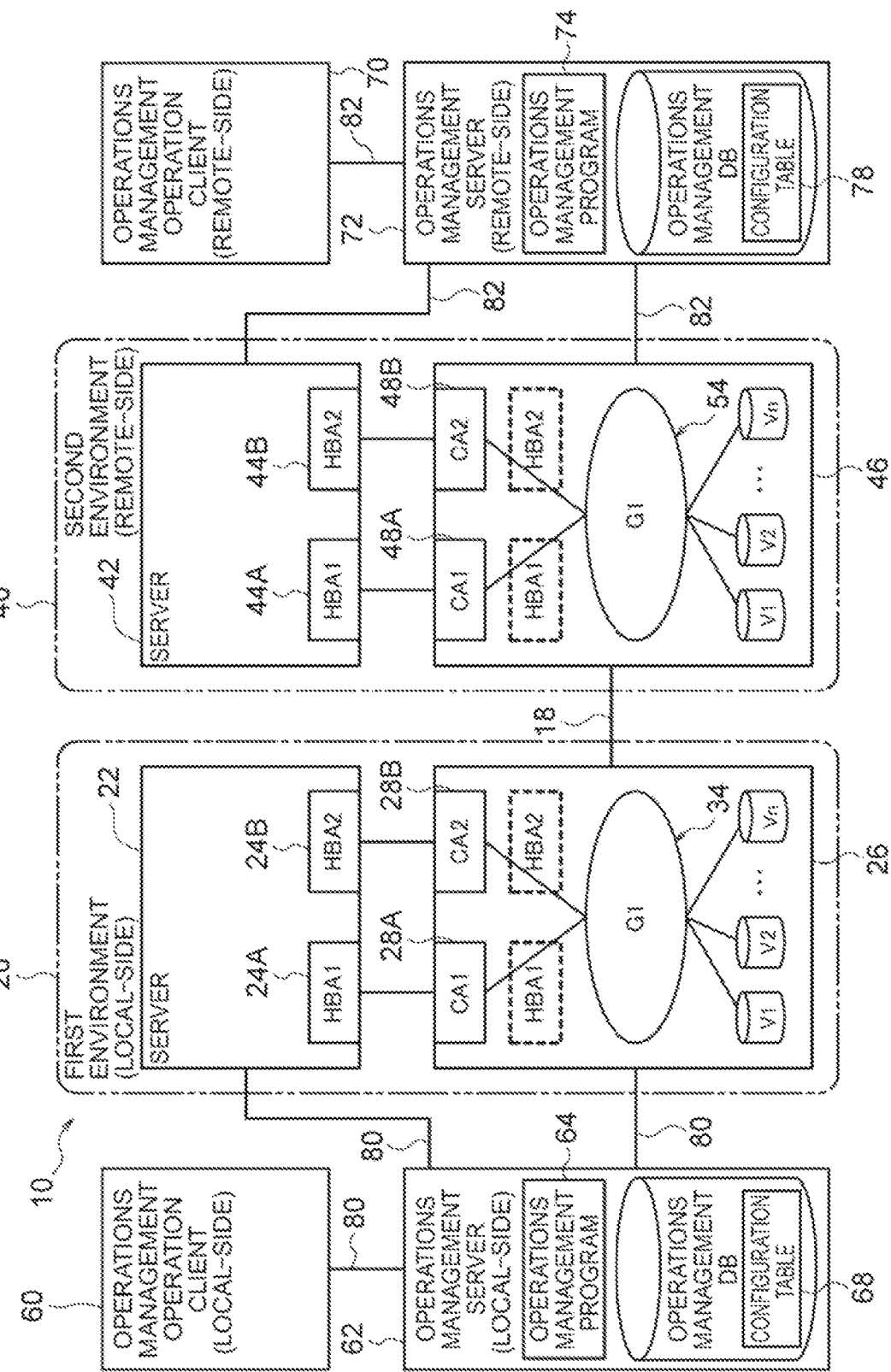
FIG. 2 is a block diagram illustrating a conceptual configuration of an environment construction apparatus according to the first exemplary embodiment.

FIG. 2 illustrates a conceptual configuration of the environment construction apparatus 10. FIG. 2 illustrates an example of the first environment 20 containing a site with a single server 22 and storage 26 connected together. The server 22 and the storage 26 in the first environment 20 are each connected by an operations management network 80 to an operations management server 62 employed for administering the operation of the first environment (local-side site) 20. An operations management operation client 60 that receives operations for operations management from a user is connected to the operations management server 62 of the first environment 20 by the operations management network 80. The operations management server 62 of the first environment 20 is stored with an operations management database (DB) for managing servers and storage. The operations management server 62 manages servers and storage according to the operations management database.

The server 22 contained in the first environment 20 is equipped with the connection section 24 for connecting to the storage 26. In the present exemplary embodiment, the connection section 24 includes plural connection sections 24A, 24B (depicted by HBA1 and HBA2 in FIG. 2) to improve redundancy, however configuration may be made with a single connection section 24. In the present exemplary embodiment, each of the connection sections 24A, 24B employs an adapter (for example a Host Bus Adapter (HBA)) to connect together the server and peripheral equipment, and World Wide Name data (WWN data) is assigned thereto as the identification data Sv to identify the individual connection sections.

The storage 26 contained hi the first environment 20 is equipped with the connection permission section 28 for connecting to the server 22. In the present exemplary embodiment, the connection permission section 28 is equipped with plural connection permission sections 28A, 28B to improve redundancy (depicted by CA1 and CA2 in FIG. 2), however configuration may be made with a single connection permission section 28. In the present exemplary embodiment, each of the plural connection permission sections 28A, 28B employs an adapter (for example a Channel Adapter (CA)) for connecting for example to a server, and WWN data is assigned to each as the identification data St for identifying the individual connection sections.

The storage 26 is also equipped with the storage section 34. The storage section 34 is capable of compiling plural internal logical regions (volumes). Plural volumes are schematically depicted (V1, V2 to Vn) in the example illustrated in FIG. 2. The storage section 34 is capable of grouping one or more than one volume into a given group. Plural volumes (V1, V2 to Vn) have been grouped into a group G1 in the example illustrated in FIG. 2. Plural groups can also be compiled in the storage section 34. The storage section 34 can create an association between the connection permission data 30 (see FIG. 1) indicating connection permission (access permission) and a given group. Namely, an association can be set for a given group setting whether or not access is permitted from the connection section 24 (the connection sections 24A or 24B in the example of FIG. 2) through the connection permission section 28 (the connection permission sections 28A, 28B in FIG. 2). In FIG. 2 an example is illustrated of an association set for the group G1 permitting access from the connection section 24A of the server 22 through the connection permission section 28A (depicted by the broken line HBA1). Similarly an association has been set for the group G1 permitting access from the connection section 24B of the server 22 through the connection permission section 28B (depicted by the broken line HBA2).

In the present exemplary embodiment, the second environment 40 illustrated in FIG. 2 functions as a remote-side site, with the server 42 and the storage 46 connected together. In the present exemplary embodiment, as an example of a remote-side site, consider an environment provided at a remote location physically separated from the first environment 20 that has been prepared as a disaster contingency. The server 42 and the storage 46 are each connected to an operations management server 72 for managing the operations of the second environment 40 through an operations management network 82. An operations management operation client 70 that receives operations for operations management from a user is connected to the operations management server 72 of the second environment 40 by the operations management network 82. The operations management server 72 of the second environment 40 is stored with an operations management database for managing servers and storage. The operations management server 72 performs management of servers and storage according to the operations management database.

The server 42 contained in the second environment 40 is equipped with the connection section 44 for connecting to the storage 46. In the present exemplary embodiment, similarly to with the connection section 44 in the first environment 20, the connection section 44 includes plural connection sections 44A, 44B to improve redundancy, however configuration may be made with a single connection section 44. Each of the connection sections 44A, 44B employs an adapter (for example a Host Bus Adapter (HBA)) and World Wide Name data (WWN data) is assigned thereto as identification data Sv to identify the individual connection sections. The storage 46 contained in the second environment 40 is equipped with the connection permission section 48 (plural connection permission sections 48A, 48B to improve redundancy) for connecting to the server 42, however configuration may be made with a single connection permission section 48. WWN data is assigned to each of the plural connection permission sections 48A, 48B. The storage 46 is also equipped with a storage section 54. In the present exemplary embodiment, the storage section 54 replicates (mirrors) the storage section 34 of the first environment 20 through the dedicated line 18.

Figure 3:
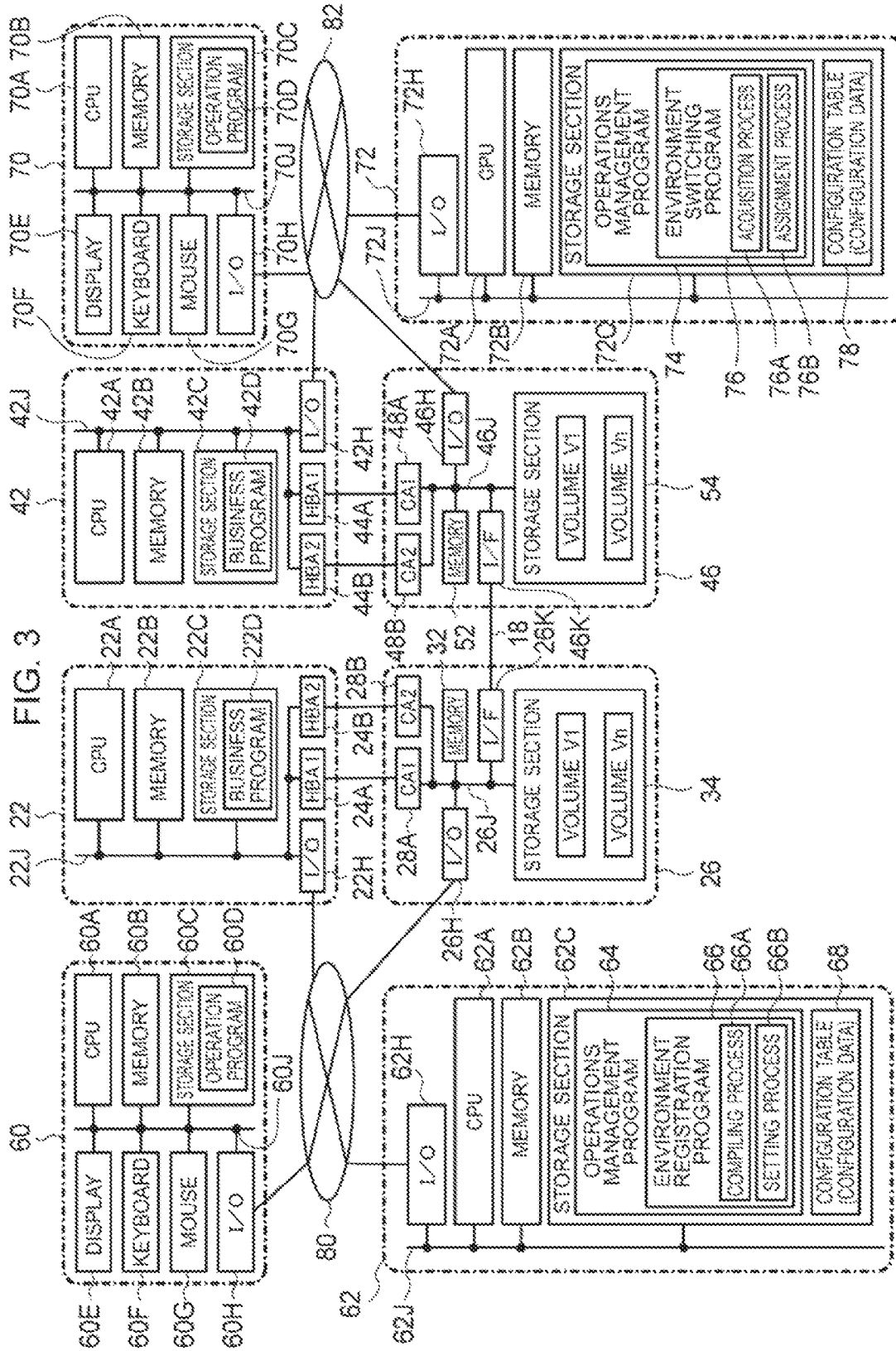
FIG. 3 is a block diagram illustrating a detailed configuration of an environment construction apparatus according to the first exemplary embodiment.

FIG. 3 illustrates details of an overall configuration containing the environment construction apparatus 10 according to the present exemplary embodiment, implemented for example by a computer and storage.

The server 22 contained in the first environment 20 may be implemented for example by the computer illustrated in FIG. 3. The server 22 is equipped with a CPU 22A, a memory 22B and a nonvolatile storage section 22C, mutually connected through a bus 22J. The server 22 includes an interface (I/O) 22H connected to the bus 22J for connecting to the operations management network 80. In the server 22, the connection section 24A for connecting to the connection permission section 28A of the storage 26 and the connection section 24B for connecting to the connection permission section 28B are connected to the bus 22J. The storage section 22C can be implemented for example by a Hard Disk Drive (HDD) or flash memory. A business program 22D is stored in the storage section 22C for causing the server 22 to function as an apparatus for performing a business service. The CPU 22A reads the business program 22D from the storage section 22C, expands the business program 22D in the memory 22B, and executes the business program 22D.

FIG. 3 illustrates an example in which the business program 22D is stored on the storage section 22C and the CPU 22A reads the business program 22D from the storage section 22C, expands the business program 22D in the memory 22B and executes the business program 22D. However, the business program 22D does not need to be stored in the storage section 22C. For example, configuration may be made with the business program 22D stored on the connection section 24 of the storage 26, with the business program 22D read from the storage 26, expanded in the memory 22B and executed.

The storage 26 contained in the first environment 20, for example as illustrated in FIG. 3, is configured with the connection permission section 28A, for connecting to the connection section 24A, and the connection permission section 286, for connecting to the connection section 24B, both connected to a bus 26J. The storage 26 also includes an interface (I/O) 26H that is connected to the bus 26J, for connecting to the memory 32, the storage section 34 and the operations management network 80. The storage 26 includes an interface (I/F) 26K connected to the bus 26J, for connecting to the storage 46 through the dedicated line 18.

The server 42 contained in the second environment 40 may for example be implemented by a computer as illustrated in FIG. 3. The server 42 is equipped with a CPU 42A, a memory 42B and a nonvolatile storage section 42C, mutually connected through a bus 42J. The server 42 includes an interface (I/O) 42H connected to the bus 42J for connecting to the operations management network 82. In the server 42, the connection section 44A, for connecting to the connection permission section 48A of the storage 46, and the connection section 44B, for connecting to the connection permission section 48B, are both connected to the bus 42J. A business program 42D is stored in the storage section 42C for causing the server 42 to function as an apparatus for performing a business service. The CPU 42A reads the business program 42D from the storage section 42C, expands the business program 42D in the memory 42B, and executes the business program 42D.

FIG. 3 illustrates an example in which the business program 42D is stored on the storage section 42C and the CPU 42A reads the business program 42D from the storage section 42C, expands the business program 42D in the memory 42B and executes the business program 42D. However, the business program 42D does not need to be stored in the storage section 42C. For example, configuration may be made with the business program 42D stored on the connection section 54 of the storage 46, with the business program 42D read from the storage 46, expanded in the memory 42B and executed.

An apparatus for operating the operations management server 62 may, for example, be implemented by the operations management operation client 60 terminal illustrated in FIG. 3. The operations management operation client 60 includes a CPU 60A, a memory 60B, a nonvolatile storage section 60C, a keyboard 60F, a mouse 60G and a display 60E, mutually connected through a bus 60J. The operations management operation client 60 includes an interface (I/O) 60H that is connected to the bus 60J for connecting to the operations management network 80. An operation program COD is stored in the storage section 60C for operating the operations management, server 62. The CPU 60A reads the operation program 60D from the storage section 60C, expands the operation program 60D in the memory 60B, and executes the operation program 60D.

An apparatus for operating the operations management server 72 may, for example, be implemented by the operations management operation client 70 terminal illustrated in FIG. 3. The operations management operation client 70 includes a CPU 70A, a memory 70B, a nonvolatile storage section 70C, a keyboard 70F, a mouse 70G and a display 70E, mutually connected through a bus 70J. The operations management operation client 70 includes an interface (I/O) 70H that is connected to the bus 70J for connecting to the operations management network 82. An operation program 70D is stored in the storage section 70C for operating the operations management server 72. The CPU 70A reads the operation program 70D from the storage section 70C, expands the operation program 70D in the memory 70B, and executes the operation program 70D.

An example is illustrated in FIG. 3 of the operations management operation client 60 in which the operation program 60D is stored in the storage section 60C, and the CPU 60A reads out the operation program 60D from the storage section 60C, expands the operation program 60D in the memory 60B, and executes the operation program 60D. However, the operation program 60D does not need to be stored on the storage section 60C. For example, as long as the operations management operation client 60 is connected to the operations management server 62, configuration may be made with, the operation program 60D executed in the operations management server 62, as long as processing that accompanies such execution can be displayed. Similar also applies to the operations management operation client 70.

The environment construction apparatus 10 according to the present exemplary embodiment can, for example, be implemented by the operations management server 62 for the first environment 20 illustrated in FIG. 3, and by the operations management server 72 for the second environment 40. The operations management server 62 includes a CPU 62A, a memory 62B, a nonvolatile storage section 62C, mutually connected through a bus 62J. The operations management server 62 also includes an interface (I/O) 62H that is connected, to the bus 62J, for connecting to the operations management network 80. The storage section 62C can be implemented for example by a Hard Disk Drive (HDD) or flash memory. An operations management program 64 including an environment registration program 66 for causing the operations management server 62 to function as part of the environment construction apparatus 10 or as an environment registration apparatus is stored in the storage section 62C. A configuration table 68 is stored in the storage section 62C The CPU 62A reads the operations management program 64 from the storage section 62C, expands the operations management program 64 in the memory 62B, and sequentially executes processes of the environment registration program 66 included in the operations management program 64.

The operations management server 72 includes a CPU 72A, a memory 72B, and a nonvolatile storage section 72C, mutually connected through a bus 72J. The operations management server 72 also includes an interface (I/O) 72H that is connected to the bus 72J, for connecting to the operations management network 82. An operations management program 74 including an environment switching program 76 for causing the operations management server 72 to function as part of the environment construction apparatus 10 or as an environment switching apparatus is stored in the storage section 72C. A configuration table 78 is also stored in the storage section 72C. The CPU 72A reads the operations management program 74 from the storage section 72C, expands the operations management program 74 in the memory 12B, and sequentially executes processes of the environment switching program 76 included in the operations management program 74.

Operations management programs are examples of the environment construction program of the technology disclosed herein. The environment registration program 66 included in the operations management program 64 is part of an environment construction program for causing the operations management server 62 to function as part of the environment construction apparatus 10. The environment switching program 76 included in the operations management program 74 is part of an environment construction program for causing the operations management server 72 to function as part of the environment construction apparatus 10. The environment registration program 66 is an example of an environment registration program for causing the operations management server 62 to function as an environment registration apparatus. The environment switching program 76 is an example of an environment switching program for causing the operations management server 72 to function as an environment switching apparatus.

The environment registration program 66 contained in the operations management program 64 of the operations management server 62 includes a compiling process 66A and a setting process 66B. The CPU 62A sets the configuration of the storage 26 in the first environment 20 by executing the compiling process 66A. Namely, the environment in the first environment 20 for the server 22 to access the storage 26 is constructed by the CPU 62A executing the compiling process 66A. By the CPU 62A executing the compiling process 66A, the same configuration is set in the storage section 54 of the storage 46 in the second environment 40 to the configuration of the storage section 34 of the storage 26 in the first environment 20. The CPU 62A operates as the setting section 12 illustrated in FIG. 1 by executing the setting process 66B. The environment construction apparatus is implemented by the operations management server 62, and the operations management server 62 operates as the setting section 12 by executing the setting process 66B. The environment construction apparatus is implemented by the operations management server 62, and the operations management server 62 operates as the environment registration apparatus by the CPU 62A executing the setting process 66B.

The setting section 12 of the environment construction apparatus 10 sets the connection permission data 30 in the storage 26 as data representing permission for the server 22 to connect to the storage section 34 of the storage 26 in the first environment 20. Accompanying this, the connection permission data 30 that has been set in the first environment 20 is also set in the storage 46 of the second environment 40. Data expressing the connection relationship between the server 22 and the storage section 34 of the storage 26 in the first environment 20 is thereby set as the connection permission data 50 in the storage 46 of the second environment 40 (see FIG. 1).

The environment switching program 76 included in the operations management program 74 of the operations management server 72 includes an acquisition process 76A and an assignment process 76B. The CPU 72A operates as the acquisition section 14 illustrated in FIG. 1 by executing the acquisition process 76A. The CPU 72A operates as the assignment section 16 illustrated in FIG. 1 by executing the assignment process 76B. The environment construction apparatus is implemented by the operations management server 72 and the operations management server 72 operates as the acquisition section 14 by executing the acquisition process 76A. The environment construction apparatus is implemented by the operations management server 72, and the operations management server 72 operates as the assignment section 16 by executing the assignment process 76B. The environment switching apparatus is implemented by the operations management server 72, and the operations management server 72 operates as the environment switching apparatus by the CPU 72A executing the acquisition process 76A and the assignment process 76B.

The acquisition section 14 of the environment construction apparatus 10 acquires for the second environment 40 the connection relationship between the server 22 and the storage section 34 of the storage 26 in the first environment 20. Namely, the connection permission data 30 of the server 22 to the storage section 34 of the storage 26 in the first environment 20 is set as the connection permission data 50 in the storage 46 in the second environment 40. The acquisition section 14 accordingly acquires the connection relationship between the server 22 and the storage 26 in the first environment 20 by acquiring the connection permission data 50.

The assignment section 16 of the environment construction apparatus 10 employs the connection permission data 30 in the first environment 20 that has been acquired by the acquisition section 14 and assigns identification data to the server 42 such that the second environment 40 is made equivalent to the first environment 20.

In the present exemplary embodiment the operations management server 62 stores connection permission data representing the connection relationship between the server 22 and the storage section 34 of the storage 26 in the first environment 20 in an operations management database. Namely, in the first environment 20 the plural servers 22 are connectable to the storage 26, and connection permission data represents the connection relationships to the storage section 34 of the storage 26 for each of the servers 22. Configuration data including one or more than one items of connection permission data for each of one or more than one servers 22 can be stored as the configuration table 68 in the memory 32 of the storage 26. The configuration table 68 stored in the memory 32, as illustrated for example in FIG. 4, is registered with data entries for "group" and "access permission setting" respectively associated with each other. In the configuration table illustrated in FIG. 4 the data for "group" is data representing groups of one or more than one volume set in the storage section 34 of the storage 26 in the first environment 20. The data of "access permission setting" are data values of "group", these being identification data (for example WWN data) of server(s) permitted to connect to given groups.

Explanation follows regarding operation of the present exemplary embodiment.

For example, there is recently demand for the construction of environments to enable business continuity at times such as when a disaster occurs, with a business operation first environment 20 (local-side site) doubled at a remote location. For example, data stored in storage such as external storage devices operating in the first environment 20 are replicated and stored in storage at a second environment 40 (remote-side site) provided at a remote location. Generally, in a first environment 20 in business operations an operations management network equipped with an operations management server is provided for managing the operation of servers and storage contained in the first environment 20. In the operations management network the servers and storage contained in the first environment 20 are access-enabled-connected to the operations management server.

For example, as a disaster countermeasure, when the second environment 40 (remote-side site) is constructed at a remote location there is a need for an operations management network equipped with an operations management server for managing operation of the servers and storage in the second environment 40. However, simply replicating the data stored in the storage employed in the first environment 20 in the storage of the second environment 40 provided at the remote location does not enable the data that is being employed to manage operations in the first environment 20 to be utilized in the second environment 40. Connecting together the operations management networks of the first environment 20 and the second environment 40 might be considered as a method to resolve this issue. However there is a facility cost incurred in connecting together operations management networks. When storage such as external storage devices is employed share data this impedes automation of environment construction and operation. There is also a need to change settings to enable servers to use the storage when operation is switched over from the first environment 20 to the second environment 40, vastly increasing the time for business recovery. Moreover, there is the possibility of input mistakes and operation mistakes arising in setting operations to enable servers to use the storage.

In consideration of the above, the present exemplary embodiment employs connection permission data. In the present exemplary embodiment, identification data (HBA WWN data) is set in storage at both sites at the same point in time during environment construction by the environment construction program, as explained below. Consequently, when site switching is performed, identification data (HBA WWN data) of the servers in the first environment 20 can be ascertained from storage.

In the present exemplary embodiment, as an example, a storage replication function (remote copy function) is utilized. In the present exemplary embodiment, as an example, identification data such as WWN data that has been set in an adapter for connecting a server to a peripheral device is employed in an assignment function (called a HBA address rename function) in an adapter in another server. Employing the storage replication function (remote copy function) and the assignment function (HBA address rename function) enables construction of a disaster countermeasure environment without using an operations management network or external storage devices between sites.

As illustrated in FIG. 1, the environment construction apparatus 10 first compiles volumes (V1, V2 to Vn) in the storage 26 of the first environment 20, this being the operation system. The number of volumes for the server 22 are then grouped (group G1). Then, mirroring volumes (V1, V2 to Vn) are compiled by replicating the volumes in the second environment 40 that is the standby system, across storage without passing through servers (called a remote copy function). Grouping as the group G1(M) is performed on the volumes mirrored in the second environment 40.

The setting section 12 of the environment construction apparatus 10 assigns the group and the server 22 in the first environment 20, and sets the storage 26 of the first environment 20 with the connection permission data 30 of the server 22 to permitted connection to volumes of a given group. For example, the connection permission data 30 can contain identification data Sv (for example WWN data) for the server 22 and identification data Gr (for example group name) representing the group of the storage 26 in the first environment 20. The setting section 12 of the environment construction apparatus 10 also sets in the storage 46 of the second environment 40 the connection permission data 30 that was set in the storage 26. The setting section 12 is thereby able to implement settings enabling operation switch over processing in the second environment 40, the standby system, by registering the operation environment of the first environment 20 in the storage 46 of the second environment 40 standby system.

The acquisition section 14 of the environment construction apparatus 10 then acquires data representing the operation environment in the first environment 20. Namely, the server connection permission data 30 representing connection permission to the group of the storage 26 of the first environment 20 is set as the connection permission data 50 in the storage 46 of the second environment 40. By acquiring the connection permission data 50 the acquisition section 14 is able to acquire the identification data Sv of server(s) permitted to connect to the group of the volumes compiled in the storage 26 of the first environment 20. The assignment section 16 assigns the server identification data Sv (for example WWN data) of the server acquired by the acquisition section 14 to the server 42 of the second environment 40. The server 42 of the second environment 40 is accordingly capable of checking the storage 46 and, for example, starting up the OS in the mirrored volumes. Consequently, operation that was being executed in the first environment 20 can be switched over to and executed (resurrected) in the second environment 40.

Explanation follows regarding the environment construction processing executed by the environment construction apparatus 10, with reference to FIG. 5 to FIG. 8. Note that in the present exemplary embodiment the dedicated line 18 is employed for such functions as replicating volumes across storage without passing through a server (utilizing a remote copy function). The present exemplary embodiment is moreover configured such that for the first environment 20 (local-side site) and the second environment 40 (remote-side site) storage can be configured from one site to both sites.

Environment Registration Processing

Figure 6:
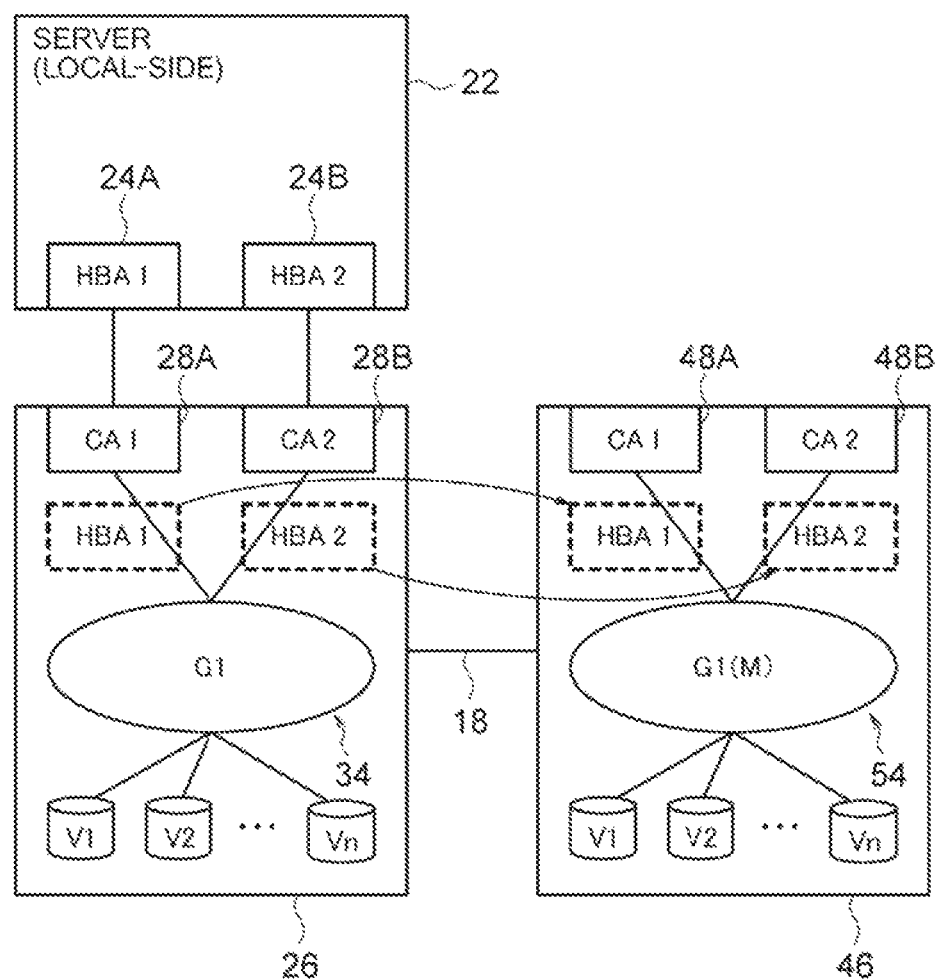
FIG. 6 is a diagram schematically illustrating an example of environment registration processing.

First, explanation follows regarding environment registration processing that is part of the environment construction processing executed by the environment construction apparatus 10. FIG. 6 schematically illustrates environment registration processing. In environment construction, for example in construction of a disaster countermeasure environment, volumes (illustrated as plural volumes V1, V2 to Vn in FIG. 6) are compiled in the storage 26 of the first environment 20, this being the local-side site that is the operation system. At the same time as this is performed, mirroring volumes (illustrated as plural volumes V1, V2 to Vn in FIG. 6) are compiled in the second environment 40, this being the remote-side site that is the standby system, by replicating volumes across storage without passing through servers (a remote copy function). On the local-side site, the number of volumes for the server are grouped. In FIG. 6, the group of the first environment 20 is indicated by G1. The mirrored group of the second environment 40 is indicated by G1(M). The assignment of groups and servers is made. Namely, connection permission data, (indicated by HBA1 and HBA2 inside the intermittent lines in FIG. 6) of the server to permit access (connection permission) of the server to the compiled volumes is set in the storage 26 of the first environment 20. The connection permission data (indicated by HBA1 and HBA2 inside the intermittent lines in FIG. 6) that has been set in the storage 26 of the first environment 20 is also set in the storage 46 of the second environment 40. Accordingly, by executing the environment registration processing on the local-side site, the environment of the local-side site is registered in the storage on the remote-side site, thereby facilitating switching over of sites by processing wholly performed at the remote-side site.

Figure 5:
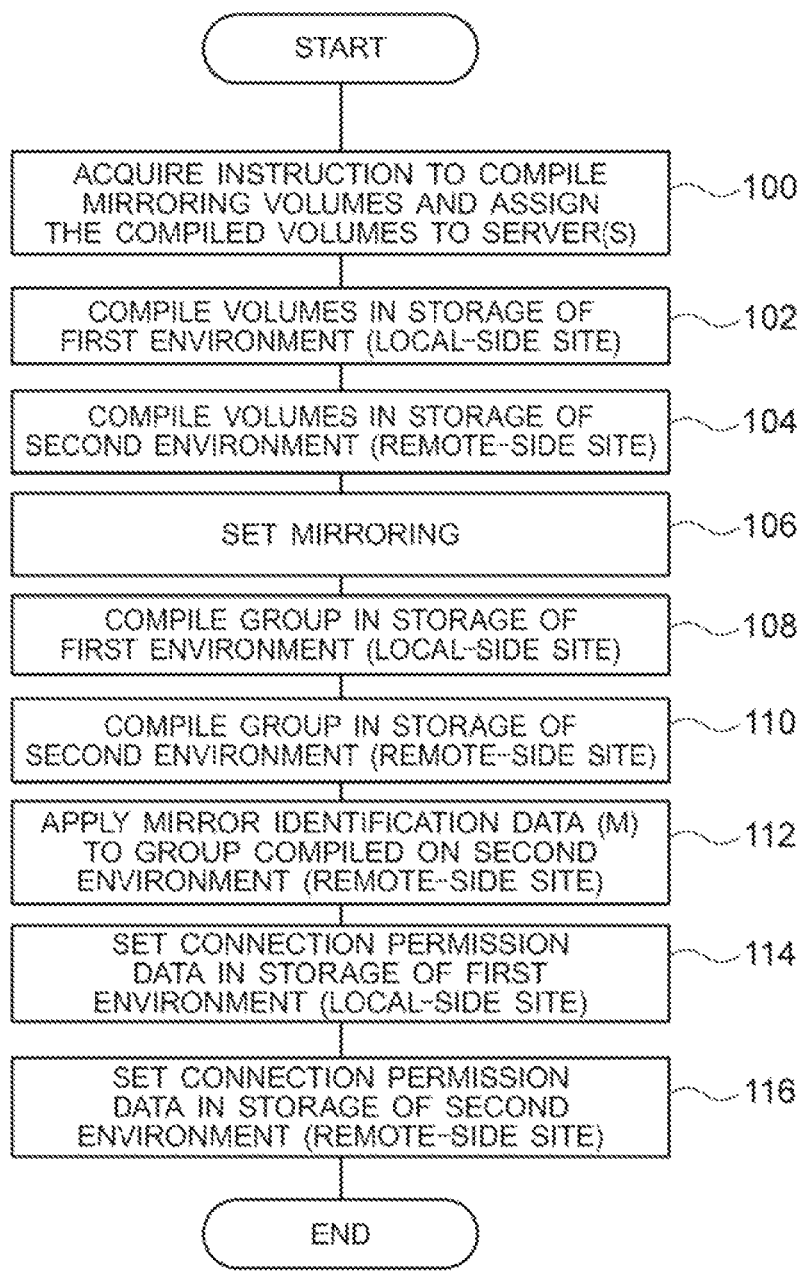
FIG. 5 is a flow chart illustrating an example of flow in environment registration processing.

More specifically, in the environment registration processing, the environment registration program illustrated in FIG. 5 is executed in the operations management server 62. First, at step 100, data is acquired representing an instruction to compile the mirroring volumes and assign the compiled volumes to server(s). Here, the operations management server 62 acquires data resulting from a user operating the operations management operation client 60. Namely, a user operates the operations management operation client 60 to instruct compiling of volumes in the storage section 34 of the storage 26 of the first environment 20. For the compilation instructed volumes, the user instructs replication from the storage 26 of the first environment 20 (local-side site) to the storage 46 of the second environment 40 (remote-side site). The user also instructs assignment of the compilation instructed volumes to the server 22 of the in-use first environment 20 (local-side site). The operations management server 62 acquires the compilation instruction of volumes in the first environment 20 instructed by the user, the replication instruction to the second environment 40, and data representing the assignment instructions of respective volumes to server(s).

Next at step 102, volumes are compiled in the storage section 34 of the storage 26 in the first environment 20 using the data acquired at step 100 representing compilation instructions for volumes in the first environment 20 instructed by the user. Namely, the operations management server 62 communicates with the storage 26 through the operations management network 80, and compiles the volumes in the storage section 34. Then, in response to data representing a user instructed replication instruction to the second environment 40 acquired at step 100, at step 104 the same volumes are compiled in the storage section 54 of the storage 46 of the second environment 40 as the volumes that have been compiled in the first environment 20. Namely, the operations management server 62 communicates with the storage 26 of the first environment 20 through the operations management network 80 and compiles the volumes in the storage 46 of the second environment 40. A function is employed here to configure the storage 46 of the second environment 40 (remote-side site) from the storage 26 of the first environment 20 (local-side site).

Then at the next step 106, the volumes of the storage 26 of the first environment 20 compiled at step 102 are set as mirroring volumes. Namely, the operations management server 62 communicates with the storage 26 through the operations management network 80 and mirroring settings are set in the storage 26 indicating that the data in the volumes compiled in the first environment 20 has been replicated in the volumes compiled in the storage section 54 of the second environment 40.

Then at step 108, a group is compiled for one or more than one volume in the first environment 29 acquired from user instruction at step 100. Namely, the operations management server 62 communicates with the storage 26 through the operations management network 80 and compiles a group of one or more than one of the volumes compiled in the storage section 34 to be treated as a set. Then at step 110, similarly to in step 108, a group to be treated as a set is compiled of one or more than one of the volumes compiled in the storage section 54 of the storage 46 of the second environment 40. Namely, the operations management server 62 communicates with the storage 26 of the first environment 20 through the operations management network 80 and compiles a group for the storage 46 of the second environment 40. A function is employed here to configure the storage 46 of the second environment 40 (remote-side site) from the storage 26 of the first environment 20 (local-side site).

Then at step 112, mirror identification data representing being a mirroring volume is applied to the group compiled, at step 110 in the storage 46 of the second, environment 40. Application of the mirror identification data can for example be executed by applying a flag (for example "M") to data representing group name when the group is compiled in the storage 46 of the second environment 40 at step 110.

The volumes and group in the storage on both sites in the first environment 20 (local-side site) and the second environment 40 (remote-side site) are compiled by the above processing of step 100 to step 112. The above processing of step 100 to step 112 corresponds to execution processing of the compiling process 66A executed by the CPU 62A to configure the storage 26 of the first environment 20 and the storage 46 of the second environment 40.

Note that in the above, explanation has been given of a case in which volumes and groups are compiled in the storage hi the first environment 20 and the second environment 40, however processing of volumes and groups that have already been compiled is also possible. While discussed in detail later, for example, when volumes that have already been compiled are employed and the compiled volumes are assigned to servers, the processing of steps 102 to 112 can be skipped.

Then in the next step 114 and step 116, the setting section 12 of the environment construction apparatus 10 sets connection permission data for the compiled volumes. First, at step 114 the setting section 12 sets access permission of server(s) to the volumes in the storage 26 of the first environment 20 that were compiled at step 102. Namely, the operations management server 62 communicates with the storage 26 through the operations management network 80 and sets the storage 26 with data of server(s) permitted to connect to the group corresponding to the compiled volumes. Specifically, setting in the storage 26 is performed by storing the connection permission data 30 in the memory 32 of the storage 26 as data representing servers permitted to connect to the storage section 34 of the storage 26 in the first environment 20.

The connection permission data includes identification data Sv and assignment data Gr. The identification data Sv is data representing an "access permission setting" for identifying the server(s) permitted to connect to the storage 26 of the first environment 20. The identification data Sv can be derived from data representing the assignment instruction to the server in the user instruction acquired at step 100. Namely, the identification data Sv may be acquired that has been set in the connection section 24 and corresponds to the data representing the assignment instruction of the user instruction to the server. The assignment data Gr is data representing the group set in the storage section 34 of the storage 26 in the first environment 20. The assignment data Gr can be derived from data representing the assignment instruction of the user instruction to the server acquired at step 100. Namely, the assignment data Gr may be derived from data representing the group of the volumes in the user instruction compiled at step 108. When a configuration table 68 containing plural connection permission data 30 is stored in the memory 32, the connection permission data 30 for the volume compiled this time may be added to the configuration table 68.

The setting section 12 then, at step 116, sets in the storage 46 of the second environment 40 access permission for server(s) to the volumes of the storage 46 compiled at step 104. Namely, the operations management server 62 communicates with the storage 26 of the first environment 20 through the operations management network 80 and stores the connection permission data 30 that was set at step 114 as the connection permission data 50 in the memory 52 of the storage 46 of the second environment 40. The connection permission data 30 of the first environment 20 is thereby set in the storage 46 of the second environment 40. A function is employed here to configure the storage 46 of the second environment 40 (remote-side site) from the storage 26 of the first environment 20 (local-side site).

The above completes the environment registration processing. By executing the environment registration processing in the first environment 20 as described above, the environment of servers in the first environment 20 permitted to connect to the storage in the first environment 20 can be made common to the storage of the first environment 20 and the second environment 40 as connection permission data. Environment registration that enables regeneration of the first environment 20 in the second environment 40 can be performed by employing the connection permission data that is common across the storage. Note that the data stored in the storage section 34 of the storage 26 is constantly being replicated (mirrored) in the storage section 54 of the storage 46 through the dedicated line 18.

Environment Switching Processing

Figure 8:
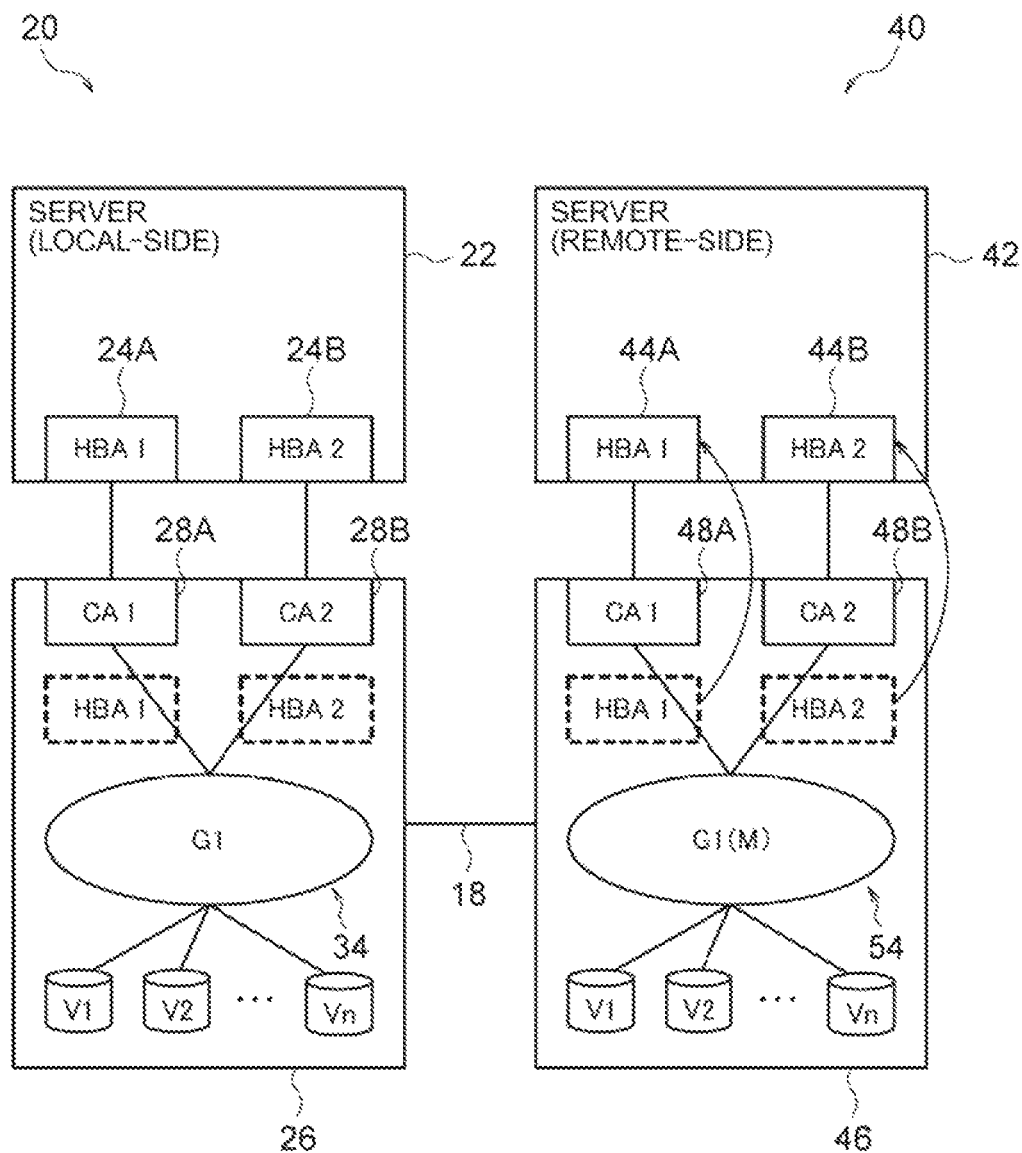
FIG. 8 is a diagram schematically illustrating an example of environment switching processing.

Explanation follows regarding environment switching processing that is part of the environment construction processing executed by the environment construction apparatus 10. FIG. 8 schematically illustrates the environment switching processing. The environment switching processing is, for example, switching processing to switch business operation in the first environment 20, this being the local-side site operation system, to the second environment 40, this being the remote-side site standby system. The volumes of the storage 26 of the first environment 20 (hat is the operation system are mirrored in the storage 46 of the second environment 40 that is the standby system by the above environment registration processing. In FIG. 8, plural volumes (illustrated as V1, V2 to Vn) have been grouped as the group G1(M). Data related to the assignment of groups and servers in the storage 26 of the first environment 20 that is the operation system are also set in the storage 46 of the second environment 40 that is the standby system. Namely, the server connection permission data indicating access permission (connection permission) to the volumes of the storage 26 of the first environment 20 is set in the storage 46 of the second environment 40. In FIG. 8, the connection permission data is illustrated by HBA1 and HBA2 inside the rectangular intermittent lines of the storage 46 on the second environment 40 side.

For example, there is a requirement to continue business operation by switching business operation to another environment during maintenance when servers are shut down for a long period in the first environment 20 being used for business operation, and when a disaster occurs and business operation using the servers is forcibly interrupted. In the present exemplary embodiment, business operation is switched to the second environment 40 that has been prepared as a standby system on the remote-side site. The data (for example WWN data) is assigned to the server 42 of the second environment 40 to identify the server 22 that was in operation in the first environment 20, included in the connection permission data of the first environment 20 set in the storage 46 of the second environment 40. In FIG. 8, the connection permission data employed during switching is illustrated as HBA1 and HBA2 inside the rectangular intermittent lines in the second environment 40. The server 42 in the second environment 40 is thereby able to check the storage 46, start up the OS In the mirrored volumes, and able to execute (resurrect) operation, which was being executed in the first environment 20, in the second environment 40.

Figure 7:
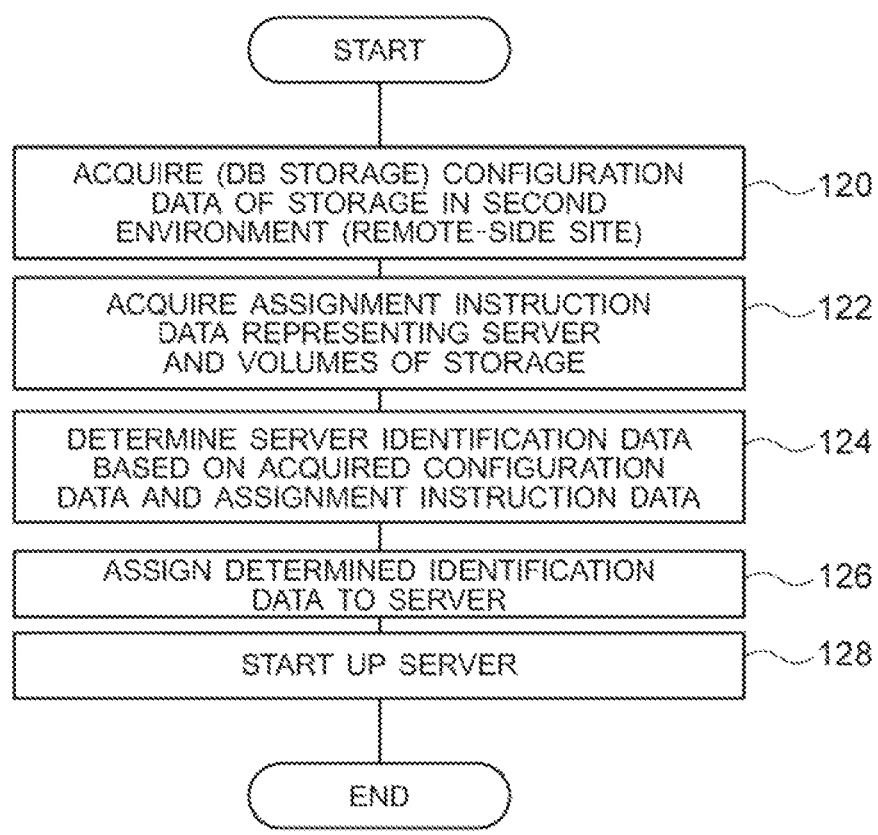
FIG. 7 is a flow chart illustrating an example of flow in environment switching processing.

More specifically, in the environment switching processing, the environment switching program illustrated in FIG. 7 is executed in the operations management server 72 of the second environment 40. For example, when a disaster or the like has occurred in the first environment 20, a user, wanting to switch over to the second environment 40 to enable business operation continuity, operates the operations management operation client 70 and instructs execution of the environment switching program. First, at step 120 the acquisition section 14 of the environment construction apparatus 10 acquires configuration data that has been set in the storage 46 of the second environment 40. Namely, configuration data is acquired that includes the connection permission data associated with the identification data identifying one or more than one server 22 that was being used in the storage 26 of the first environment 20 (local-side site). Then at step 122 the acquisition section 14 of the environment construction apparatus 10 acquires data (assignment instruction data) representing assignment instructions of servers and volumes (groups) of storage for business operation in the second environment 40. The operations management server 72 here acquires the data resulting from a user operating the operations management operation client 70. Namely, the user operates the operations management operation client 70, and specifies assignment in the storage section 54 of the storage 46 of a server in the second environment 40 (remote-side site) and a group including the mirrored volumes. The operations management server 72 acquires the assignment instruction data representing the assignment instruction in which the user has specified the group (volumes) assigned to server(s) in the second environment 40 that has been mirrored from the first environment 20.

For example, the acquisition section 14 of the environment construction apparatus 10 is capable of sequentially executing the following processing using the operations management server 72 at step 120. First, the operations management server 72 acquires the configuration data that was set in the storage 46 of the second environment 40. The acquired configuration data is then displayed to enable selection on the display 70E of the operations management operation client 70. The connection permission data is displayed on the display 70E with the identification data of one or more than one server 22 that had been using the storage 26 in the first environment 20 associated with the group (volumes) compiled in the storage 26. The user operates the keyboard 70F and the mouse 70G of the operations management operation client 70, and instructs the connection permission data for construction in the second environment 40 from among the configuration data being displayed on the display 70E. The operations management server 72 acquires the instructed connection permission data as assignment instruction data representing the assignment instruction of groups (volumes) to servers for reconstructing the first environment 20 in the second environment 40.

By the processing of step 120 and step 122 described above, the correspondence relationship between groups and servers of the storage section 34 being used in the first environment 20 (local-side site), and data related to the server to be employed for restart in the second environment 40 (remote-side site), are acquired. The processing of step 120 and step 122 described above corresponds to the execution processing of the acquisition process 6A executed by the CPU 72A of the operations management server 72 in the second environment 40.

Then at step 124, the assignment section 16 of the environment construction apparatus 10 determines the identification data to identify the server 42 to be used in the second environment 40 from configuration data acquired at step 120 mid the assignment instruction data acquired at step 122. Namely, assignment of the server 42 and volumes (groups) of the storage 46 in the second environment 40 is contained in the assignment instruction data. Identification data of servers 22 associated with groups of the storage section 34 that were being employed in the first environment 20 are contained in the configuration data. The identification data of the servers 22 in the first environment 20 can accordingly be determined in the configuration data from the volumes (groups) of the storage 46 assigned and specified by the user. Specifically, the HBA WWN data, this being the identification data Sv that was set in the connection section 24 of the server 22, is determined from among the connection permission data 50 contained in the memory 52. Namely, at step 124, the identification data of the server(s) 22 that were being employed in the first environment 20 (local-side site) can be identified and determined at step 124.

Then at step 126, the assignment section 16 of the environment construction apparatus 10 assigns the identification data of the server 22 that was being employed in the first environment 20 determined at step 124 to the server 42 in the second environment 40. Specifically, HBA WWN data that is the identification data Sv, as the identification data of the server 22 that was being employed in the first environment 20 determined at step 124, is set in the connection section 44 of the server 42 in the second environment 40 instructed by the user. Note that the processing of step 126 can employ a function (for example HBA address rename function) to assign other identification data to the identification data that has already been set in the connection section.

The server 22 that was being employed in the first environment 20 and settings of the storage 46 are assigned to the second environment 40 by the processing of step 126. The processing of step 126 described above corresponds to the executed processing of the assignment process 76B executed by the CPU 72A of the operations management server 72 in the second environment 40.

The HBA WWN data that is the identification data Sv that was being employed in the first environment 20 is assigned to the server 42 of the second environment 40 by step 126, and so the server 42 of the second environment 40 can access the groups that have been mirrored from the first environment 20. At step 128 the operations management server 72 in the second environment 40 therefore instructs the server 42 that has been assigned with the HBA WWN data to be started up. The server 42 is accordingly started up with the OS in the mirrored volume in the storage 46. Namely, in the second environment 40, the equivalent server 42 to the server 22 that was being employed in the first environment 20 can be started up in the second environment 40, enabling business operation to be performed.

The above processing completes environment switching processing in the environment construction apparatus 10. The connection permission data that has been made common across storage as described above is employed, and so by executing the environment switching processing in the second environment 40, the environment of servers in the first environment 20 permitted to connect to the storage in the first environment 20 can be assigned to the second environment 40. Thus environment switching can be accomplished that is capable of replicating the first environment 20 in the second environment 40.

Second Exemplary Embodiment

Explanation follows regarding a second exemplary embodiment. The second exemplary embodiment is an embodiment in which servers and storage are connected together through a relay section. The second exemplary embodiment is configured substantially the same as the first exemplary embodiment, and so the same reference numerals are allocated and further explanation thereof is omitted.

Figure 9:
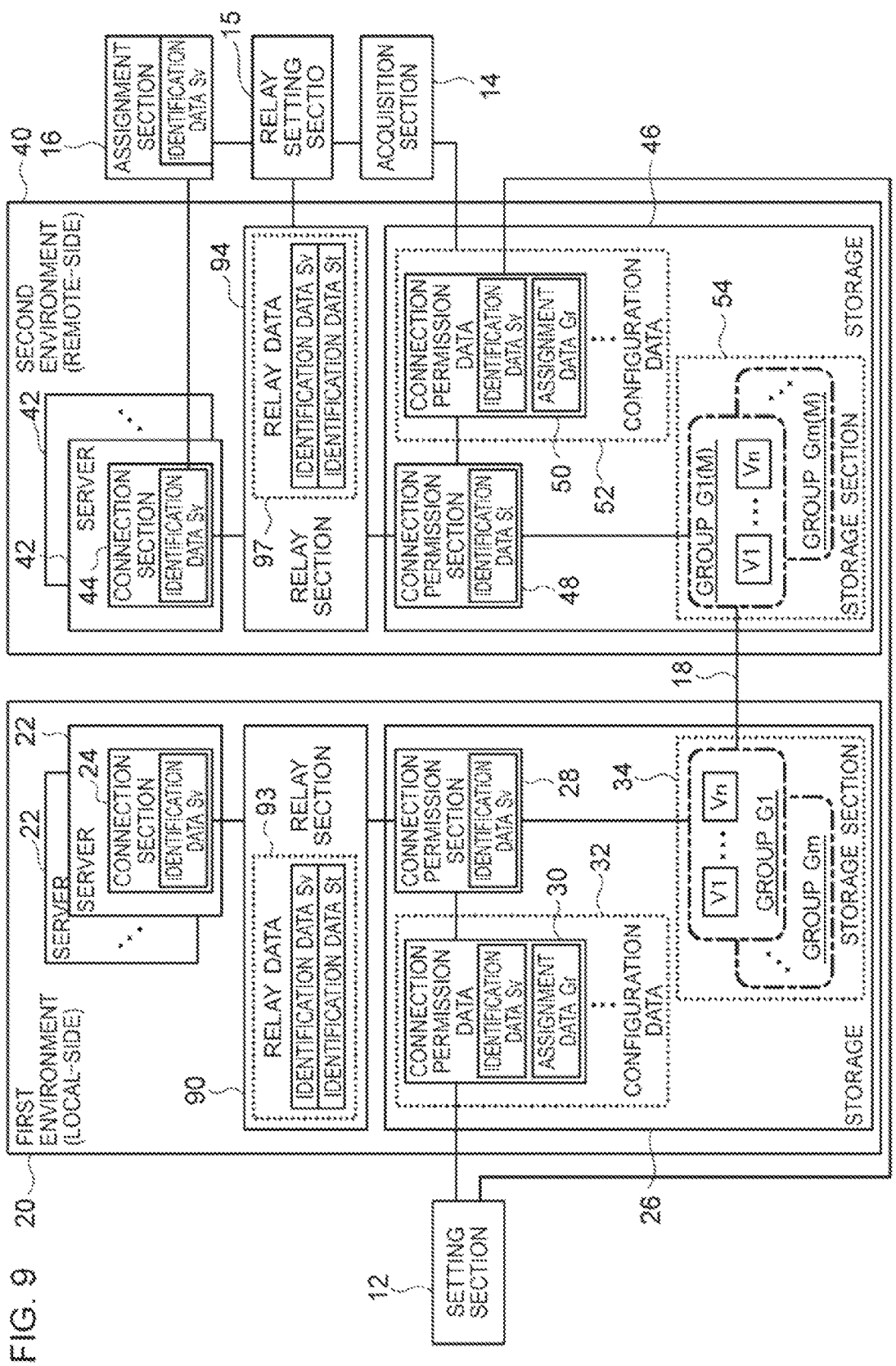
FIG. 9 is a block diagram illustrating a schematic configuration of an environment construction apparatus according to a second exemplary embodiment.

FIG. 9 illustrates an environment construction apparatus 10 according to the present exemplary embodiment. The environment construction apparatus 10 includes a setting section 12, an acquisition section 14, a relay setting section 15 mid an assignment section 16. Note that the second exemplary embodiment differs from the first exemplary embodiment in that a relay section 90 is additionally provided between the servers 22 and the storage 26 configured as illustrated in FIG. 1, and a relay section 94 is additionally provided between the servers 42 and storage 46.

The first environment 20 in the present exemplary embodiment contains the relay section 90, with plural servers 22 connected to the storage 26 through the relay section 90. A fiber channel switch is an example of the relay section 90. The relay section 90 is equipped with a memory 93 stored with relay data representing correspondence relationships between servers and storage connected to the relay section 90. An example of relay data is identification data Sv for identifying servers 22 associated and stored with identification data St for identifying storage. The relay section 90 is connected to the setting section 12. Note that configurations of the servers 22 and the storage 26 contained in the first environment 20 are similar to those of the first exemplary embodiment. An example is given in FIG. 9 of plural servers 22, however configuration may be made with a single server 22.

The second environment 40 of the present exemplary embodiment includes the relay section 94, and plural servers 42 and storage 46 are connected together through the relay section 94. The relay section 94 is equipped with a memory 97 stored with relay data representing correspondence relationships between servers and storage connected to the relay section 94. The relay section 94 is also connected to the relay setting section 15.

Figure 10:
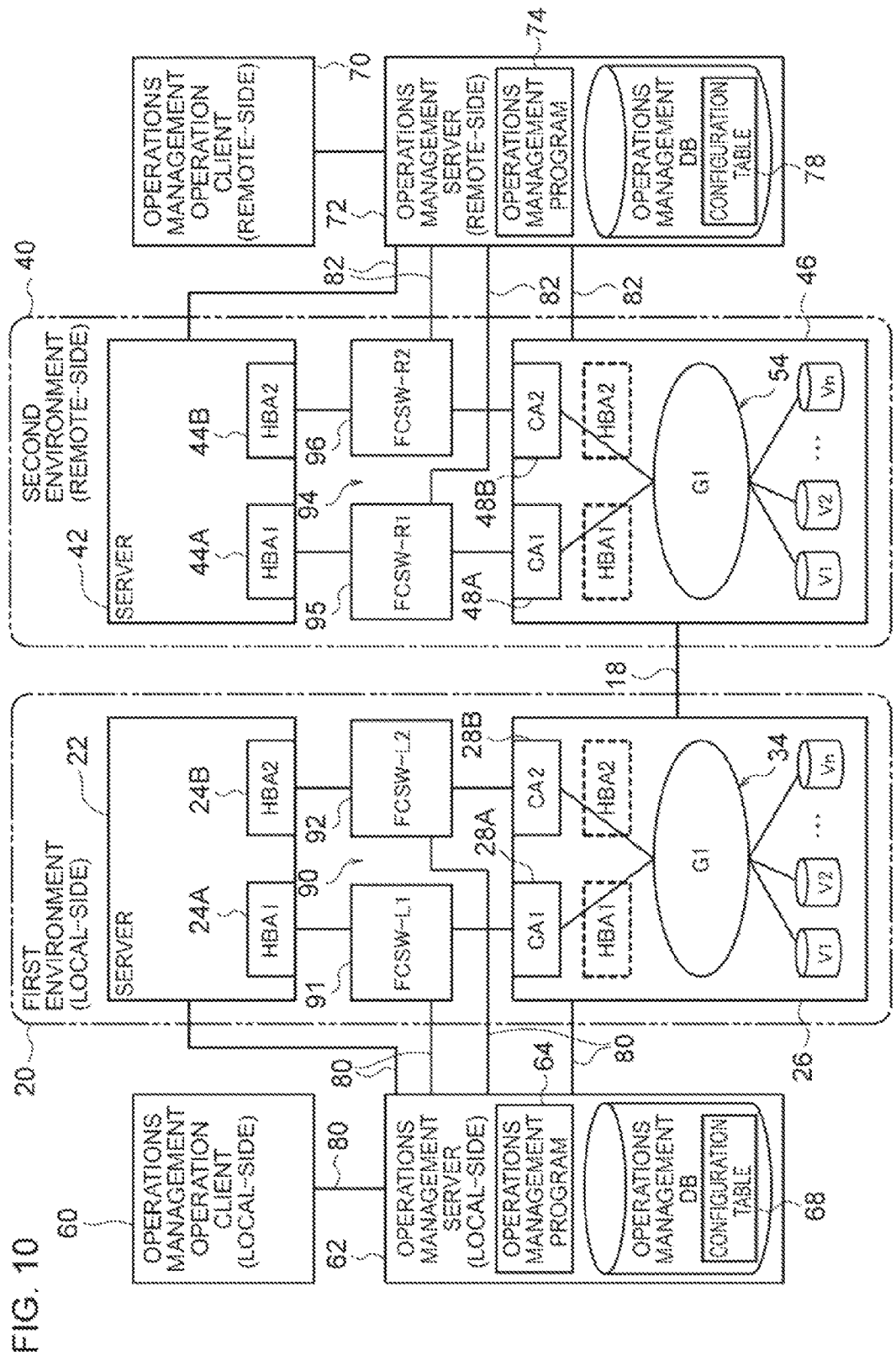
FIG. 10 is a block diagram illustrating a conceptual configuration of an environment construction apparatus according to the second exemplary embodiment.

FIG. 10 illustrates a conceptual configuration of the environment construction apparatus 10 according to the present exemplary embodiment. In the example illustrated in FIG. 10 there is a first environment 20 including a site in which a single server 22 and storage 26 are connected together through the relay section 90. In the example illustrated in FIG. 10 there is a second environment 40 including a site single server 42 and storage 46 connected together through the relay section 94. Note that in FIG. 10, the relay section connecting the server 22 and the storage 26 is equipped with plural relay sections 91, 92 (depicted by FCSW-L1 and FCSW-L2 in FIG. 10) in order to improve redundancy, however configuration may be made with a single relay section. The relay section 94 connecting together the server 42 and the storage 46 is also equipped with plural relay sections 95, 96 (depicted by FCSW-R1 and FCSW-R2 in FIG. 10) in order to improve redundancy, however configuration may be made with a single relay section. The present exemplary embodiment illustrated in FIG. 10 differs from the configuration illustrated in FIG. 2 in that the relay sections 91, 92 are additionally provided between the server 22 and the storage 26, and the relay sections 95, 96 are additionally provided between the server 42 and the storage 46.

Figure 11:
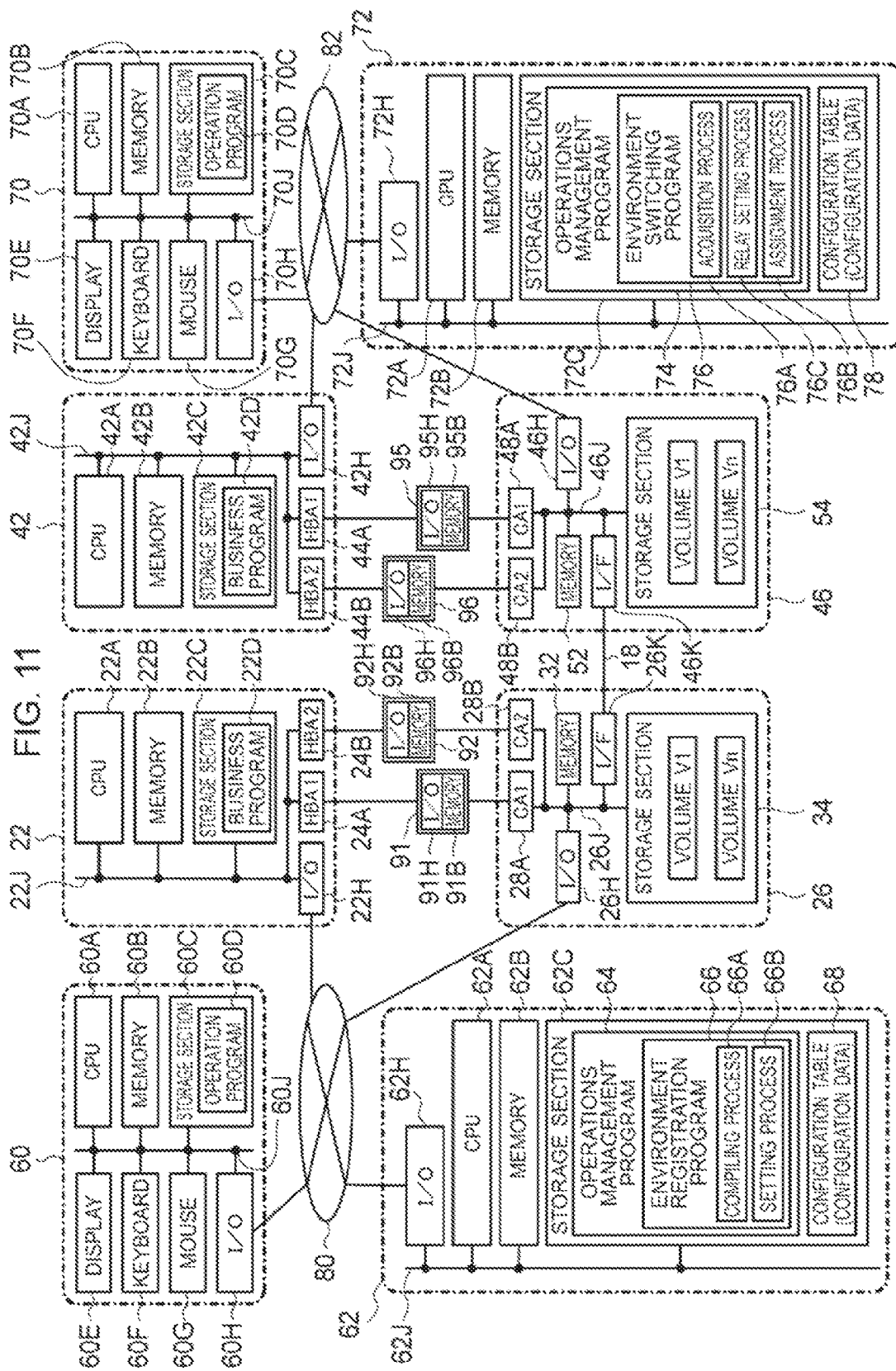
FIG. 11 is a block diagram illustrating a detailed configuration of an environment construction apparatus according to the second exemplary embodiment.

FIG. 11 illustrates details of an overall configuration including the environment construction apparatus 10 according to the present exemplary embodiment, implemented through the relay section for example by a computer and storage. Note that the present exemplary embodiment illustrated in FIG. 11 differs from the configuration illustrated in FIG. 3 in that the relay sections 91, 92 are additionally provided between the server 22 and the storage 26, and the relay sections 95, 96 are additionally provided between the server 42 and the storage 46. It also differs in that for the environment switching program 76, a relay setting process 76C is included in addition to an acquisition process 76A and an assignment process 76B.

In the present exemplary embodiment, a fiber channel switch is employed as the relay section 90 contained in the first environment 20, and the relay section 91 that is part of the fiber channel switch is equipped with a memory 91B and an interlace (I/O) 91H for connecting to the operations management network 80. The relay section 92 that is part of the fiber channel switch is also equipped with a memory 92B and an interface (I/O) 92H for connecting to the operations management network 80. A fiber channel switch is employed as the relay section 94 contained in the second environment 40 and the relay section 95 that is part of the fiber channel switch is also equipped with a memory 95B and an interface (I/O) 95H for connecting to the operations management network 82. The relay section 96 that is part of the fiber channel switch is also equipped with a memory 96B and an interface (I/O) 96H for connecting to the operations management network 82.

In the present exemplary embodiment, the setting process 66B of the environment registration program 66 included in the operations management program 64 of the operations management server 62 includes processing to set the relay section 90. Namely, by executing the setting process 66B the CPU 62A performs setting processing of the relay section 90 in addition to the processing of the setting section 12 illustrated in FIG. 1. Namely, the CPU 62A is operated as the setting section 12 illustrated in FIG. 9 by executing the setting process 66B. The environment construction apparatus is implemented by the operations management server 62, and the operations management server 62 is operated as the setting section 12 by executing the setting process 66B. The environment registration apparatus is implemented by the operations management server 62, and the operations management server 62 is operated as the environment registration apparatus by the CPU 62A executing the setting process 66B.

The setting section 12 of the environment construction apparatus 10 in the present exemplary embodiment sets connection permission data 30, representing connection permission of the server 22 to the group of the storage 26 of the first environment 20, in the storage 26. Accompanying this, the connection permission data 30 that was set is also set in the storage 46 of the second environment 40. The setting section 12 sets relay data representing a relay between the server 22 and the storage 26 of the first environment 20 in the relay section 90. The connection permission data 30 representing the connection relationships between the server 22 and the group of the storage 26 in the first environment 20 can thereby be made common to the storage 46 of the second environment 40. Moreover, relay between the server 22 and the storage 26 in the first environment 20 can be achieved by the relay section 90.

In the present exemplary embodiment, an environment switching program 76 included in an operations management program 74 of an operations management server 72 includes an acquisition process 76A, an assignment process 76B and a relay setting process 76C. A CPU 72A operates as an acquisition section 14 (FIG. 9) by executing the acquisition process 76A, and operates as an assignment section 16 (FIG. 9) by executing the assignment process 76B. The CPU 72A also operates as the relay setting section 15 illustrated in FIG. 9 by executing the relay setting process 76C. The environment construction apparatus is implemented by the operations management server 72, and the operations management server 72 operates as the acquisition section 14 by executing the acquisition process 76A, and the operations management server 72 operates as the assignment section 16 by executing the assignment process 76B. The environment construction apparatus Is implemented by the operations management, server 72, and the operations management server 72 operates as the relay setting section 15 by executing the relay setting process 76C. The environment switching apparatus is implemented by the operations management server 72, and the operations management server 72 operates as the environment switching apparatus according to the present exemplary embodiment by the CPU 72A executing the acquisition process 76A, the assignment process 76B and the relay setting process 76C.

The acquisition section 14 of the environment construction apparatus 10 of the present exemplary embodiment acquires in the second environment 40 the connection relationship between the server 22 and the storage section 34 (groups) of the storage 26 in the first environment 20. The acquisition section 14 also acquires the identification data St (for example WWN data) for identifying the connection permission section 28 (each of the plural connection permission sections 28A, 28B) of the storage 26. The acquisition section 14 is able to acquire identification data identifying the storage 46 to which the server 42 is to be connected in the second environment 40 by acquiring the identification data St.

The assignment section 16 employs the connection permission data 30 of the first environment 29 that has been acquired by the acquisition section 14 to assign the identification data to the server 42 such that the second environment 40 is equivalent to the first environment 20.

The relay setting section 15 associates the identification data Sv of the server 42, which has been assigned in the second environment 40 so as to be equivalent to in the first environment 20, with the identification data St for identifying the storage 46 to be connected to the server 42 in the second environment 40, and sets the relay section 94 accordingly. The relay section 94 can thereby relay between the server 42 and the storage 46 in the second environment 40.

Explanation follows regarding operation of the present exemplary embodiment, and the environment construction processing executed by the environment construction apparatus 10 according to the present exemplary embodiment, with reference to FIG. 12 to FIG. 15.

Environment Registration Processing

Figure 13:
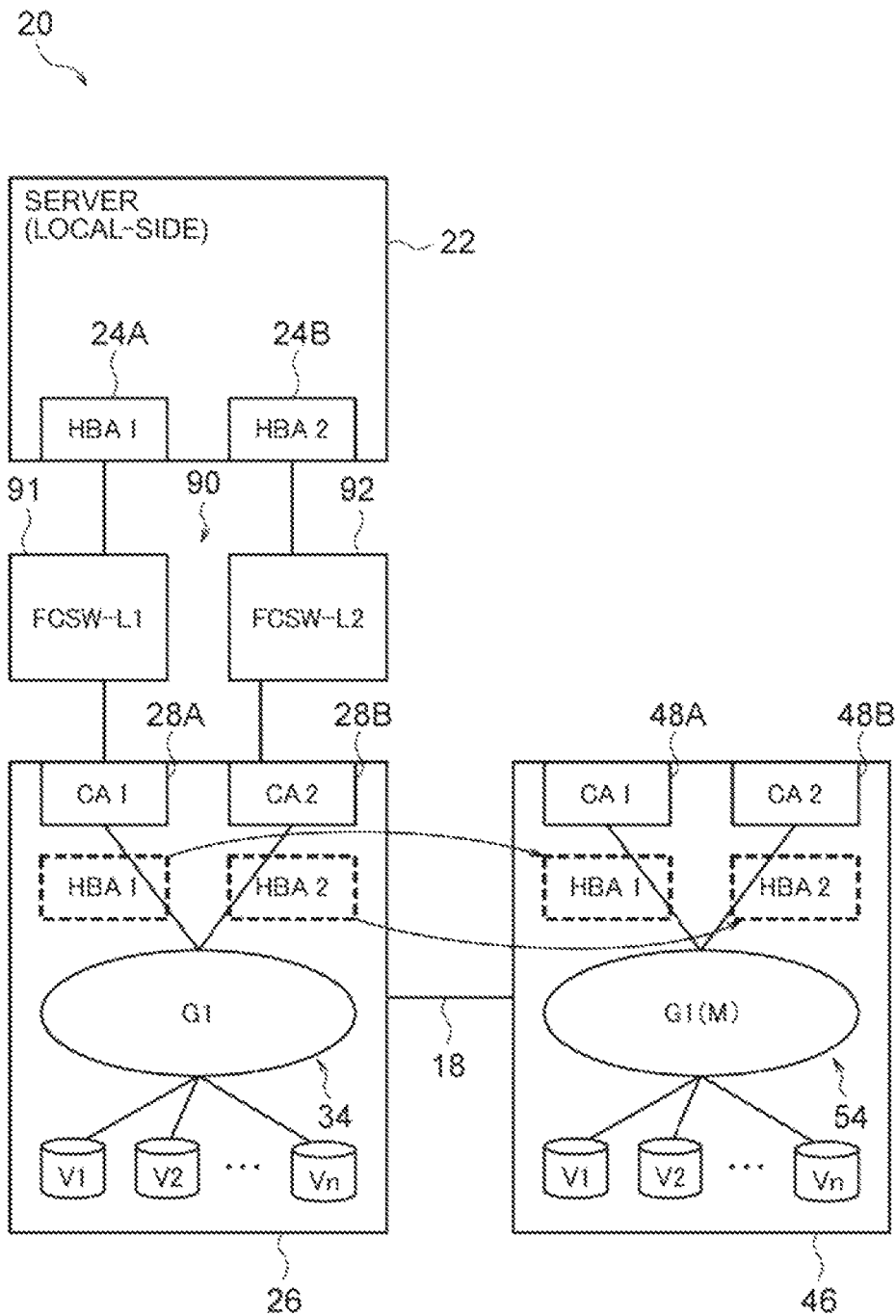
FIG. 13 is a diagram schematically illustrating an example of environment registration processing.

Explanation first follows regarding the environment registration processing that is part of the environment construction processing executed by the environment construction apparatus 10. FIG. 13 schematically illustrates the environment registration processing. As illustrated in FIG. 13, during environment construction, communication between the server 22 and the storage 26 of the first environment 20 is executed through the relay section 91 and the relay section 92 configuring the relay section 90.

Figure 12:
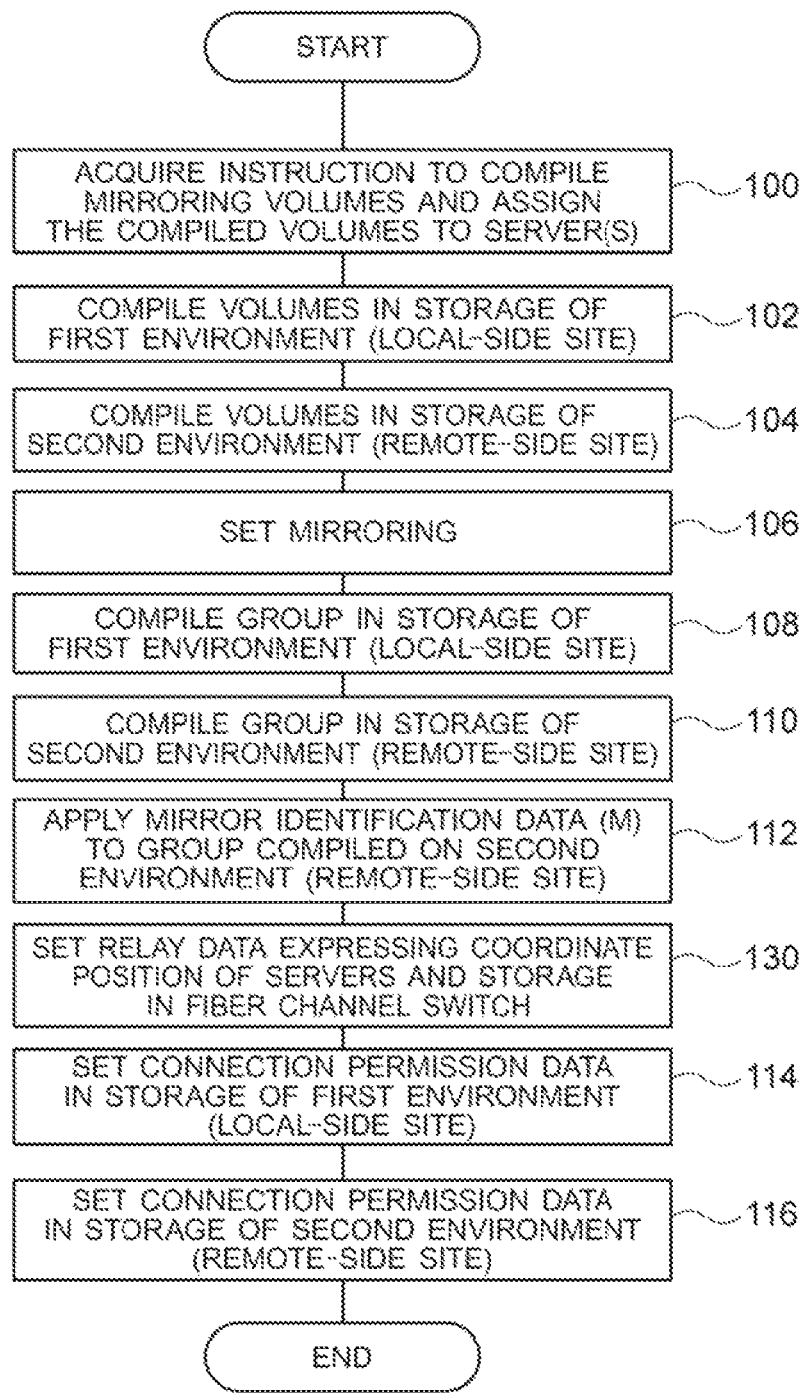
FIG. 12 is a flow chart, illustrating an example of flow in environment registration processing.

More precisely, in the environment registration processing, the environment registration program illustrated in FIG. 12 is executed in the operations management server 62. First, data is acquired representing an instruction from a user to compile mirroring volume(s) and to assign the mirroring volume(s) to the server 22 (step 100). Then the volumes are compiled in the storage 26 of the first environment 20 (step 102), and volumes are compiled in the storage 46 of the second environment 40 that are the same as the volumes compiled in the first environment 20 (step 104). Then the volumes that have been compiled in the storage 46 of the second environment 40 are set as mirroring volumes (step 106). Then group(s) are compiled for the respective volumes in the first environment 20 and the second environment 40 (step 108, step 110), and the mirror identification data is appended to the groups compiled in the storage 46 of the second environment 40 (step 112). The mirror identification data is illustrated in FIG. 13 as "M", with the group G1(M) depicted. Performing the above processing of step 100 to step 112 compiles volumes and groups in the storage at the two sites, the first environment 20 (local-side site) and the second environment 40 (remote-side site).

Then at step 130 the setting section 12 of the environment construction apparatus 10 sets relay data in the fiber channel switch that is the relay section 90. Namely, the identification data Sv of the server 22 assigned in the first environment 20 and the identification data St identifying the storage 26 to which the server 22 is connected is set in the relay section 90. The relay section 90 can thereby act as a relay in the first environment 20 between the server 22 and the storage 26.

Then the setting section 12 of the environment construction apparatus 10 sets connection permission data in the storage 26 of the first environment 20 and in the storage 46 of the second environment 40 (step 114 and step 116). The environment of server(s) in the first environment 20 permitted to connect to the storage of the first environment 20 can, as connection permission data, thereby be made common in the storage of the first environment 20 and the second environment 40.

The above completes environment registration processing in the environment construction apparatus 10 including the relay section 90 that acts as a relay for data exchange between the server 22 and the storage 26.

Environment Switching Processing

Figure 15:
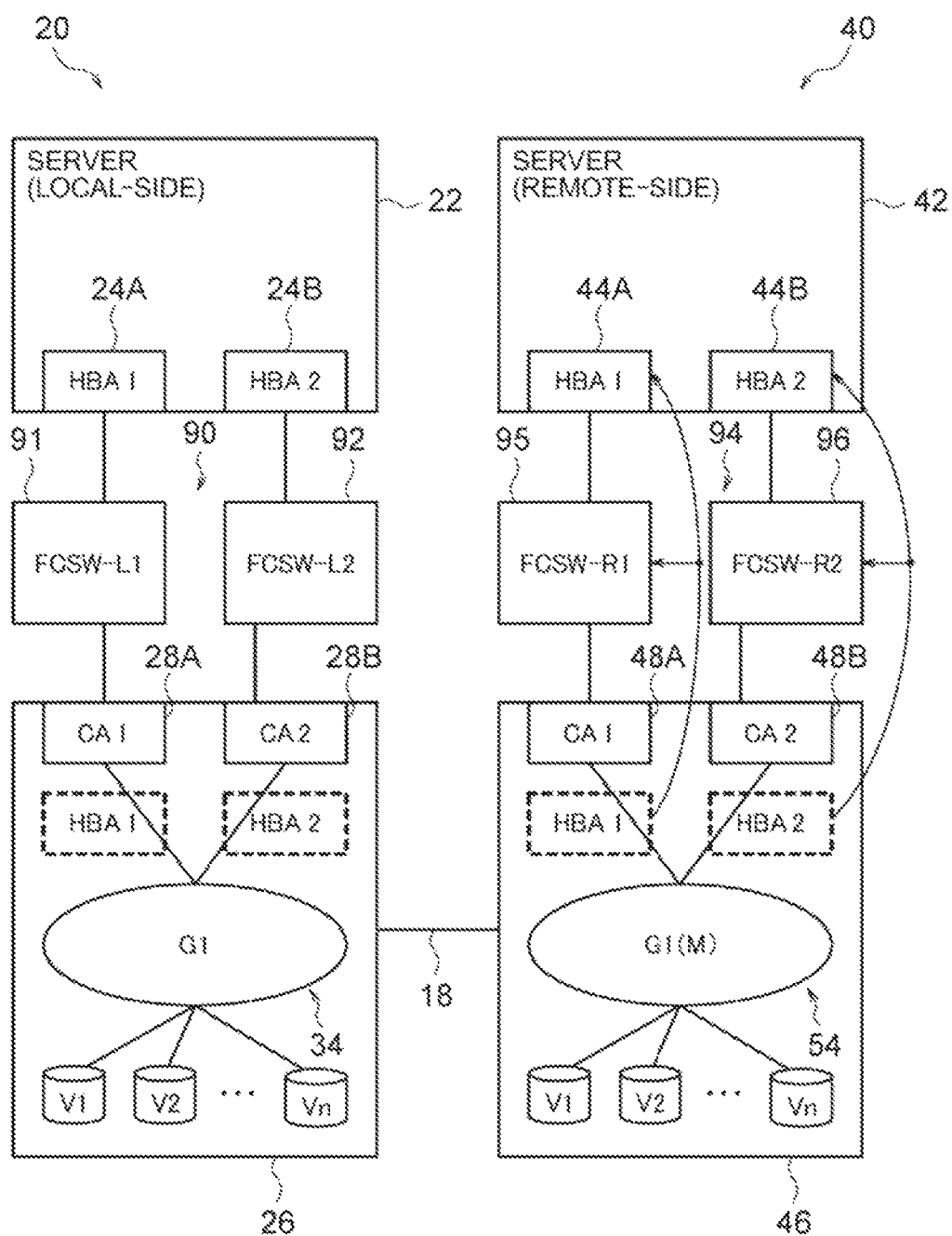
FIG. 15 is a diagram schematically illustrating an example of environment switching processing.

Explanation follows regarding environment switching processing that is part of the environment construction processing executed by the environment construction apparatus 10. FIG. 15 schematically illustrates environment switching processing. As illustrated in FIG. 15, in environment switching, the relay sections 91, 92, i.e. the relay section 90, is provided in the second environment 40 between the server 42 and the storage 46. As an example of the present exemplary embodiment, explanation follows regarding switching business operation in the first environment 20, including the relay section 90 that is on the local-side site in the operation system, to business operation in the second environment 40 including the relay section 94 that is on the remote-side site in the standby system.

The volumes in the storage 26 of the first environment 20 are mirrored in the storage 46 of the second environment 40 by the above environment registration processing. Data relating to the assignment of groups in the storage 26 and servers of the first environment 20 is also set in the storage 46 of the second environment 40 in the standby system. Namely data (for example WWN data) that has been set in the storage 46 of the second environment 40 for identifying the server that was being operated in the first environment 20, included in the connection permission data of the first environment 20, is assigned to the server of the second environment 40. In FIG. 15 the connection permission data employed during switch over is illustrated as HBA1 and HBA2 inside the rectangular intermittent lines in the second environment 40. The data (for example WWN data) for identifying the server to set in the storage 46 of the second environment 40 can, through assignment to the server 42, be employed to determine whether or not the server 42 in the second environment 40 is permitted to connect to the storage 46.

Data is set in the relay section 96 (the relay sections 95, 96) that associates the identification data Sv of the connection section 44 of the server 42 with the identification data St of the connection permission section 48 of the storage 46. Namely, the identification data Sv of the connection section 24 of the server 22 in the first environment 20 is derived from the connection permission data 30 that has been set in the storage 46 of the second environment 40. The identification data St is also set in the storage 46 of the second environment 40. Data that associates the identification data Sv of the connection section 24 in the server 22 of the first environment 20 with the identification data St of the storage 46 of the second environment 40 is set in the relay section 94. The relay section 94 can accordingly act as a relay between the server 42 and the storage 46 that have been assigned the identification data of She server 22 in the first environment 20.

Figure 14:
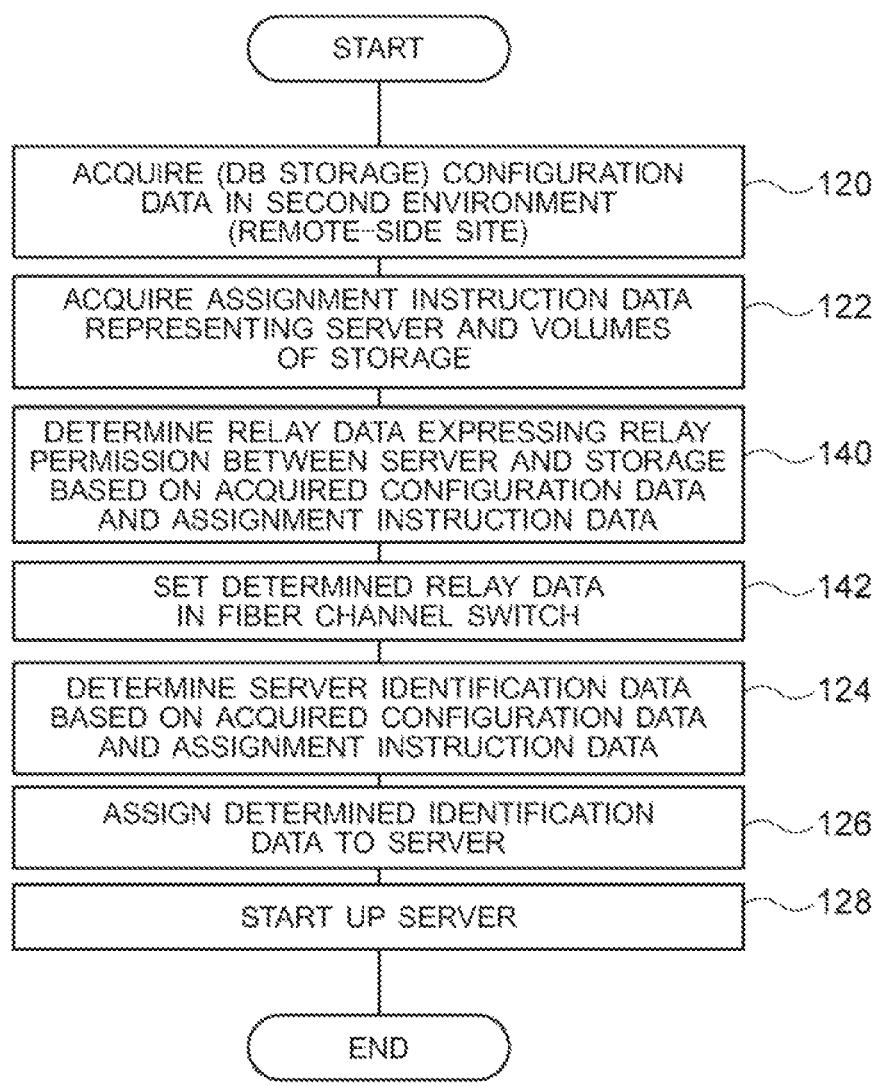
FIG. 14 is a flow chart illustrating an example of flow in environment switching processing.

More precisely, in environment switching processing, the environment switching program illustrated in FIG. 14 is executed in the operations management server 72 of the first environment 20. First, the acquisition section 14 of the environment construction apparatus 10 acquires configuration data that has been set in the storage 46 of the second environment 40 (step 120). Then the acquisition section 14 of the environment construction apparatus 10 acquires the assignment instruction data representing the server and the volumes (groups) of storage to be employed for business operation in the second environment 40 that have been assigned by distraction from a user (step 122). For example, after acquiring the configuration data that has been set in the storage 46 of the second environment 40, the operations management server 72 displays the configuration data on the display 70E, and connection permission data that has been instructed from the display as the connection permission data for constructing the second environment 40 is acquired. The acquired connection permission data is assignment instruction data representing assignment instructions of groups (volumes) to server(s) for reconstructing the first environment 20 in the second environment 40. Note that in the present exemplary embodiment, the identification data St for identifying the storage 46 to which the server 42 is to be connected in the second environment 40 is also acquired.

The processing of step 140 and step 142 corresponds to the execution processing of the acquisition process 76A executed by the CPU 72A of the operations management server 72 in the second environment 40.

Then at step 140, the relay setting section 15 of the environment construction apparatus 10 determines relay data using the configuration data and the assignment instruction data that has been acquired at step 120 and step 122. Namely, the volumes (groups) included in the assignment instruction data is associated with data (for example WWN data) for identifying the server that was in operation in the first environment 20 (see also FIG. 4). Consequently, the server identification data Sv (for example WWN data) can be determined by identifying from the configuration data the connection permission data containing the volumes (groups) of the storage contained in the assignment instruction data. Data is determined as relay data in which the identification data St of the storage 46 to which the server 42 is to be connected in the second environment 40 has been associated with the determined identification data Sv. Then at step 142 the relay setting section 15 sets the relay data that has been determined at step 140 in the relay section 94.

Performing the processing of step 140 and step 142 sets the relay section 94 with the relationship between server and storage for relay by the relay section 94 in the second environment 40. The processing of step 140 and step 142 corresponds to the execution processing of the relay setting process 76C executed by the CPU 72A of the operations management server 72 in the second environment 40.

Next, the assignment section 16 of the environment construction apparatus 10 determines the identification data Sv for identifying the server 42 to be employed for operation in the second environment 40 using the configuration data and assignment instruction data that has been acquired in step 120 and step 122 (step 124). Then the assignment section 16 of the environment construction apparatus 10 assigns the identification data Sv determined at step 124 of the server 22 that was being operated in the first environment 20 to the server 42 of the second environment 40 (step 126). In order to assign the identification data Sv to the server 42 of the second environment 40, for example, previously set identification data can be assigned other identification data by employing an assignment function (for example HBA address rename function).

Performing the processing of step 126 results in the settings for the server 22 that was being operated in the first environment 20 and the storage 46 being assigned to the second environment 40 (remote-side site). The processing of step 126 corresponds to the execution processing of the assignment process 76B executed by the CPU 72A of the operations management server 72 in the second environment 40.

When the identification data Sv (WWN data) of the server in the first environment 20 has been assigned to the server 42 of the second environment 40, the server 42 of the second environment 40 is able to access the group of the mirrored storage 46. The operations management server 72 in the second environment 40 instructs start up of the server 42 (step 128). The server 42 can thereby be started up as an equivalent to the server 22 that was being operated in the first environment 20, and business operation can be performed in the second environment 40.

The above processing completes the environment switching processing in the environment construction apparatus 10 that has servers and storage connected together through relay sections. As described above, by employing the connection permission data that has been made common in the storage, and by executing the environment switching processing in the second environment 40, the environment of server(s) in the first environment 20 permitted to connect to the storage in the first environment 20 can be assigned in the second environment 40. Even in an environment in which a server and storage are connected through a relay section, the data permitting relay between the server and the storage can employed by a relay section for processing in the second environment 40. Environment switching can thereby be accomplished in which it is possible to replicate the first environment 20 in the second environment 40.

Note that while explanation has been given in the present exemplary embodiment of an embodiment in which servers and storage are connected together through relay sections both in the first environment 20 and the second environment 40, there is no limitation to provision of a relay section in both the first environment 20 and the second environment 40. For example, application is also possible in cases in which server(s) and storage are only connected through a relay section in one or other of the first environment 20 or the second environment 40.

Third Exemplary Embodiment

Explanation follows regarding a third exemplary embodiment. The third exemplary embodiment is an embodiment in which environment construction processing is performed on volumes of storage that have already been compiled in a first environment 20. The present exemplary embodiment is configured substantially the same as the above exemplary embodiments, and so the same reference numerals are allocated to similar features and further explanation thereof is omitted.

Figure 16:
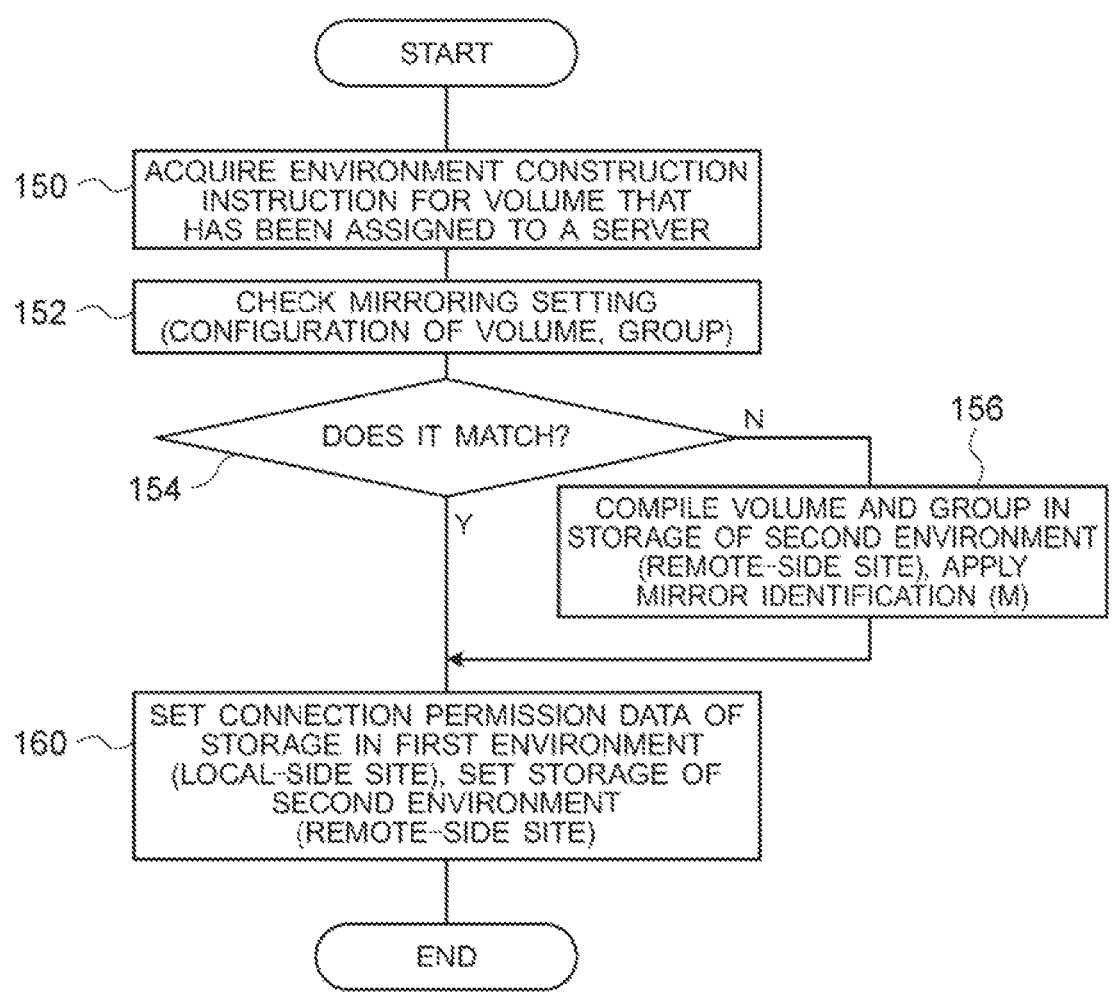
FIG. 16 is a flow chart illustrating flow in environment construction processing according to a third exemplary embodiment.

Next, regarding operation of the present exemplary embodiment, explanation follows regarding environment construction processing executed by an environment construction apparatus 10 according to the present exemplary embodiment, with reference to FIG. 16.

Explanation first follows regarding environment registration processing that is part of environment construction processing executed by the environment construction apparatus 10. In the environment registration processing according to the present exemplary embodiment, the environment registration program illustrated in FIG. 16 is executed in the operations management server 62. First, at step 150, data is acquired representing an environment construction instruction for already compiled volumes that have been assigned to a server. An operations management server 62 acquires result data here from an operations management operation client 60 that has been operated by a user. Namely, a user operates the operations management operation client 60, and instructs environment registration processing for volumes that have already been assigned to the server 22 in the first environment 20 and have already been compiled in the storage section 34 of the storage 26. The operations management server 62 acquires data representing the instructed volume that has already been assigned to the server instructed by the user.

Note that when volumes have only been compiled in the storage of the first environment 20 but the volumes have not yet been assigned to a server, configuration may be made such that the data representing an assignment instruction of the server 22 to the storage (volume) in the first environment 20 is additionally acquired.

Next in step 152, determination is made as to whether or not mirroring has been set in the second environment 40 for the volume in the first environment 20 that was instructed by the user and acquired at step 150. Namely, the operations management server 62 communicates with the storage 26 through the operations management network 80, and determines whether or not mirroring has been set for the volume in the storage section 34 by reference to the storage 26.

Step 154=Y when the volume instructed by a user has already been assigned to a server and has already been set for mirroring, and processing proceeds to step 160. At step 160, similar processing is executed to the processing of step 114 and step 116 above (see FIG. 5 and FIG. 12). Namely, a setting section 12 of the environment construction apparatus 10 sets the connection permission data in the storage 26 in the first environment 20 and in the storage 46 of the second environment 40 (step 114 and step 116). The environment of the server(s) of the first environment 20 permitted to connect to the storage in the first environment 20 can thereby be made common in the first environment 20 and the second environment 40 as the connection permission data.

However, when step 154=N, processing proceeds to step 160 only after executing processing of step 156. At step 156, similar processing is executed to the processing executed at above step 102 to step 112 (see FIG. 5) or above step 102 to step 112 and step 130 (see FIG. 12). Namely, a volume and group are compiled in the storage of both the first environment 20 (local-side site) and the second environment 40 (remote-side site). Note that in the processing at step 156 only the processing that has not yet been performed in the second environment 40 (remote-side site) needs to be executed out of the processing of step 102 to step 112 and step 130.

Note that since the environment switching processing that is part of the environment construction processing executed by the environment construction apparatus 10 is similar to that in the above exemplary embodiments, further explanation is omitted.

As explained above, according to the present exemplary embodiment, environment construction can be performed even for storage that has already been constructed.

Note that explanation has been given of an example in which the environment construction apparatus, the environment registration apparatus and the environment switching apparatus are implemented by computer. However there is no limitation to such configurations, and obviously various improvements and modifications may be implemented within a range not departing from the spirit explained above.

Explanation has been given of embodiments in which the data stored in the storage section 34 of the first environment 20 is replicated (mirrored) in the storage section 54 of the storage 46 of the second environment 40, however there is no limitation thereto. For example, the technology disclosed herein is also easily applicable to cases in which part of the data stored in the storage section 34 is mirrored.

Moreover, although explanation has been given of embodiments in which programs are pre-stored (installed) in storage sections, there is no limitation thereto. For example, it is possible to provide the environment registration program and the environment switching program of the technology disclosed herein in a format stored on a storage medium, such as a CD-ROM or DVD-ROM.

An exemplary embodiment exhibits the advantageous effect of constructing a system in which it is possible to switch from a first system of a server and storage to a second system different from the first system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

All cited documents, patent applications and technical standards mentioned in the present specification are incorporated by reference in the present specification to the same extent as if the individual cited documents, patent applications and technical standards were specifically and individually incorporated by reference in the present specification.

What is claimed is:

1. An environment construction apparatus comprising:
a processor; and
a memory storing instructions, which when executed by the processor perform a procedure, the procedure including:
(a) in a state in which data, stored in a first storage section of a first system including a first server equipped with a connection section that stores identification data for self-identification and including a first storage that is equipped with the first storage section storing the data and that is connected to the connection section of the first server, is also stored in a second storage section of a second system including a second server equipped with a connection section that stores identification data for self-identification and including a second storage that is equipped with the second storage section storing the data and that is connected to the connection section of the second server, by the first system:
setting, in the first storage of the first system, connection permission data representing connection permission for the first server to the first storage and containing identification data of the first server, and
setting, also in the second storage of the second system, the connection permission data that was set in the first storage;
(b) by the second system, acquiring the connection permission data of the first storage of the first system that was set in the second storage; and
(c) extracting identification data of the first server in the first system from the connection permission data of the first storage of the first system that has been acquired in (b), and assigning the extracted identification data of the first server in the first system as identification data stored in the connection section of the second server in the second system,
in a case in which the identification data stored in the connection section of the first server and the identification data contained in the set connection permission data match, the first storage permits connection between the first server and the first storage; and
in a case in which the identification data assigned in the connection section of the second server and the identification data contained in the set connection permission data match, the second storage permits connection between the second server and the second storage.

2. The environment construction apparatus of claim 1, wherein:
(a) includes, on the first system including a plurality of first servers each equipped with a connection section that stores identification data for self-identification and including the first storage that is equipped with the first storage section storing the data and that is connected to each of the connection sections of the plurality of first servers, in a state in which the data stored in the first storage section of the first storage is stored in a second storage section of the second storage of the second system including the second server equipped with a connection section that stores identification data for self-identification and including the second storage that is equipped with the second storage section storing the data and that is connected to the connection section of the second server, in the first system, setting the first storage with connection permission data representing connection permission for each of the plurality of first servers to the first storage and containing identification data of each of the plurality of first servers, and setting the second storage of the second system with the connection permission data of the first storage that was set in the first storage; and
(c) includes extracting identification data of one of the servers among the plurality of first servers in the first system based on the connection permission data of the first storage in the first system acquired in (b) and assigning the extracted identification data of the one server among the plurality of first servers in the first system to identification data stored in the connection section of the second server in the second system.

3. The environment construction apparatus of claim 2, wherein:
(b) further includes acquiring assignment instruction data representing assignment for connecting together the second server and the second storage in the second system; and
(c) includes extracting, based on the acquired assignment instruction data, the identification data of the one server among the plurality of first servers in the first system acquired in (b).

4. The environment construction apparatus of claim 1, wherein
the second storage in the second system includes a connection permission section that stores identification data for self-identification;
a relay section is provided between the second server and the second storage in the second system; and the procedure further includes
(d) connecting together the second server and the second storage of the second system with the relay section, and
(e) setting relay data representing connection between the second server and the second storage in the second system, based on identification data of the second storage in the second system stored in the connection permission section and based on identification data of the first server that has been assigned to the second server in the second system in (c).

5. The environment construction apparatus of claim 1, wherein:

the first storage in the first system comprises a first connection permission section that is connected to the first server of the first system and is stored with identification data for self-identification; and the second storage in the second system comprises a second connection permission section that is connected to the second server of the second system and is stored with identification data for self-identification.

6. The environment construction apparatus of claim 1, wherein the first storage of the first system includes one or plurality of small regions, and a small regions, among the one or plurality of small regions, that is permitted to connect to the first server is set as a region group.

7. The environment construction apparatus of claim 1, wherein the connection permission data comprises World Wide Name (WWN) data contained in a Host Bus Adapter (HBA).

8. The environment construction apparatus of claim 1, wherein:

the first system is an operation system; and the second system is a standby system provided at a remote location physically separated from the operation system.

9. The environment construction apparatus of claim 1, wherein:

the data stored in the first storage section of the first storage in the first system is an operating system for starting up the first server;

the first server connects to the first storage to start up the first server at the time of power application; and the second server connects to the second storage to start up the second server as the first server at the time of power application.

10. The environment construction apparatus of claim 1, wherein in a case of operation failure of the first system, the second server connects to the second storage to start up the second server as the first server at the time of power application.

11. An environment switching apparatus comprising:

a processor; and a memory storing instructions, which when executed by the processor perform a procedure, the procedure including:

(a) in a state in which data, stored in a first storage section of a first system including a first server equipped with a connection section that stores identification data for self-identification and including a first storage that is equipped with the first storage section storing the data and that is connected to the connection section of the first server, is also stored in a second storage section of a second system including a second server equipped with a connection section that stores identification data for self-identification and including a second storage that is equipped with the second storage section storing the data and that is connected to the connection section of the second server, by the first system:

setting, in the first storage of the first system connection permission data representing connection permission for the first server to the first storage and containing identification data of the first server, and setting, also in the second storage of the second system the connection permission data of the first storage in the first system that was set in the first storage, (b) acquiring, by the second system, the connection permission data that was set in the second storage; and (c) extracting identification data of the first server in the first system from the connection permission data of the first storage of the first system that has been acquired in (b), and assigning the extracted identification data of the first server in the first system as identification data stored in the connection section of the second server in the second system, in a case in which the identification data stored in the connection section of the first server and the identification data contained in the set connection permission data match, the first storage permits connection between the first server and the first storage; and in a case in which the identification data assigned in the connection section of the second server and the identification data contained in the set connection permission data match, the second storage permits connection between the second server and the second storage.

12. The environment switching apparatus of claim 11, wherein (a) includes, on the first system including a plurality of first servers each equipped with a connection section that stores identification data for self-identification and including the first storage that is equipped with the first storage section storing the data and that is connected to each of the connection sections of the plurality of first servers, in a state in which the data stored in the first storage section of the first storage is stored in the second storage section of the second storage of the second system including the second server equipped with the connection section that stores identification data for self-identification and including the second storage that is equipped with the second storage section stored with data and that is connected to the connection section of the second server, and in a state in which in the first system the first storage is set with connection permission data representing connection permission for each of the plurality of first servers to the first storage and containing identification data of each of the plurality of first servers, and the second storage of the second system is set with the connection permission data of the first storage that was set in the first storage, acquiring, in the second system, the connection permission data of the first storage in the first system that was set in the second storage; and (c) includes extracting identification data of one of the servers among the plurality of first servers in the first system based on the connection permission data of the first storage in the first system acquired in (a) and assigning the extracted identification data of the one server among the plurality of first servers in the first system to identification data stored in the connection section of the second server in the second system.

13. An environment construction method comprising:

(a) by a processor, in a state in which data, stored in a first storage section of a first system including a first server equipped with a connection section that stores identification data for self-identification and including a first storage that is equipped with the first storage section storing the data and that is connected to the connection section of the first server, is also stored in a second storage section of a second system including a second server equipped with a connection section that stores identification data for self-identification and including a second storage that is equipped with the second storage section storing the data and that is connected to the connection section of the second server, by the first system:

setting, in the first storage of the first system, connection permission data representing connection permission for the first server to the first storage and containing identification data of the first server, and setting also in the second storage of the second system, the connection permission data that was set in the first storage;

(b) by the processor, acquiring, by the second system, the connection permission data of the first storage of the first system that was set in the second storage; and (c) by the processor, extracting identification data of the first server in the first system from the connection permission data of the first storage of the first system that has been acquired in (b), and assigning the extracted identification data of the first server in the first system as identification data stored in the connection section of the second server in the second system, in a case in which the identification data stored in the connection section of the first server and the identification data contained in the set connection permission data match, the first storage permits connection between the first server and the first storage; and in a case in which the identification data assigned in the connection section of the second server and the identification data contained in the set connection permission data match, the second storage permits connection between the second server and the second storage.

14. An environment switching method comprising:

(a) in a state in which data, stored in a first storage section of a first system including a first server equipped with a connection section that stores identification data for self-identification and including first storage that is equipped with the first storage section storing the data and that is connected to the connection section of the first server, is also stored in a second storage section of a second system including a second server equipped with a connection section that stores identification data for self-identification and including a second storage that is equipped with the second storage section storing the data and that is connected to the connection section of the second server, by the first system:

setting, in the first storage of the first system connection permission data representing connection permission for the first server to the first storage and containing identification data of the first server, and setting, also in the second storage of the second system the connection permission data of the first storage in the first system that was set in the first storage, (b) acquiring, by the second system, the connection permission data that was set in the second storage; and (c) extracting identification data of the first server in the first system from the connection permission data of the first storage of the first system that has been acquired in (b), and assigning the extracted identification data of the first server in the first system as identification data stored in the connection section of the second server in the second system, in a case in which the identification data stored in the connection section of the first server and the identification data contained in the set connection permission data match, the first storage permits connection between the first server and the first storage; and in a case in which the identification data assigned in the connection section of the second server and the identification data contained in the set connection permission data match, the second storage permits connection between the second server and the second storage.

15. A non-transitory computer-readable recording medium having stored therein a program for causing a computer to execute an environment construction process comprising:

(a) in a state in which data, stored in a first storage section of a first system including a first server equipped with a connection section that stores identification data for self-identification and including first storage that is equipped with the first storage section storing the data and that is connected to the connection section of the first server, is also stored in a second storage section of second storage of a second system including a second server equipped with a connection section that stores identification data for self-identification and including a second storage that is equipped with the second storage section storing the data and that is connected to the connection section of the second server, by the first system:

setting, in the first storage of the first system, connection permission data representing connection permission for the first server to the first storage and containing identification data of the first server, and setting, also in the second storage of the second system, the connection permission data that was set in the first storage;

(b) acquiring, by the second system, the connection permission data of the first storage of the first system that was set in the second storage; and (c) extracting identification data of the first server in the first system from the connection permission data of the first storage of the first system that has been acquired in (b), and assigning the extracted identification data of the first server in the first system as identification data stored in the connection section of the second server in the second system, in a case in which the identification data stored in the connection section of the first server and the identification data contained in the set connection permission data match, the first storage permits connection between the first server and the first storage; and in a case in which the identification data assigned in the connection section of the second server and the identification data contained in the set connection permission data match, the second storage permits connection between the second server and the second storage.

16. A non-transitory computer-readable recording medium having stored therein a program for causing a computer to execute an environment switching process comprising:

(a) in a state in which data, stored in a first storage section of a first system including a first server equipped with a connection section that stores identification data for self-identification and including first storage that is equipped with the first storage section storing the data and that is connected to the connection section of the first server, is also stored in a second storage section of second storage of a second system including a second server equipped with a connection section that stores identification data for self-identification and including the second storage that is equipped with the second storage section storing the data and that is connected to the connection section of the second server, by the first system:

setting, in the first storage connection permission data representing connection permission for the first server to the first storage and containing identification data of the first server, and setting, also in the second storage of the second system the connection permission data of the first storage in the first system that was set in the first storage, (b) acquiring, the second system, the connection permission data that was set in the second storage; and (c) extracting identification data of the first server in the first system from the connection permission data of the first storage of the first system that has been acquired in (b), and assigning the extracted identification data of the first server in the first system as identification data stored in the connection section of the second server in the second system, in a case in which the identification data stored in the connection section of the first server and the identification data contained in the set connection permission data match, the first storage permits connection between the first server and the first storage; and in a case in which the identification data assigned in the connection section of the second server and the identification data contained in the set connection permission data match, the second storage permits connection between the second server and the second storage.

\* \* \* \* \*